United States Patent
Bi et al.

(10) Patent No.: US 11,837,872 B1
(45) Date of Patent: Dec. 5, 2023

(54) ROCOF CONSTRAINED UNIT COMMITMENT CONSIDERING SPATIAL DIFFERENCE IN FREQUENCY DYNAMICS

(71) Applicant: NORTH CHINA ELECTRIC POWER UNIVERSITY, Beijing (CN)

(72) Inventors: Tianshu Bi, Beijing (CN); Cheng Wang, Beijing (CN); Jiahao Liu, Beijing (CN); Guoyi Xu, Beijing (CN)

(73) Assignee: NORTH CHINA ELECTRIC POWER UNIVERSITY, Beijing (CN)

( * ) Notice: Subject to any disclaimer, the term of this patent is extended or adjusted under 35 U.S.C. 154(b) by 0 days.

(21) Appl. No.: 18/116,603

(22) Filed: Mar. 2, 2023

(51) Int. Cl.
  *H02J 3/46* (2006.01)
  *H02J 3/00* (2006.01)

(52) U.S. Cl.
  CPC .............. *H02J 3/466* (2020.01); *H02J 3/002* (2020.01)

(58) Field of Classification Search
  None
  See application file for complete search history.

(56) References Cited

U.S. PATENT DOCUMENTS

| | | | |
|---|---|---|---|
| 2013/0015663 A1* | 1/2013 | Kumula | H02J 3/01 290/52 |
| 2018/0095123 A1 | 4/2018 | Biswas | |
| 2018/0316175 A1 | 11/2018 | Tavikumar | |

OTHER PUBLICATIONS

Notice of References cited in Notice of Allowance dated Sep. 7, 2023 in U.S. Appl. No. 18/218,203.

* cited by examiner

*Primary Examiner* — Jared Fureman
*Assistant Examiner* — Joel Barnett
(74) *Attorney, Agent, or Firm* — Hunton Andrews Kurth LLP

(57) ABSTRACT

This disclosure provides a method to limit the post-disturbance node maximum RoCoF by optimizing UC decisions. The node initial RoCoF expressions under common disturbance types, including the load, the line switching, and the generator turbine disturbances, are derived. Then, the piecewise linear relationship between the node initial RoCoF and UC decision variables are obtained. To avoid numerical simulation of the node maximum RoCoF, two analytical constraints, i.e., the node initial RoCoF constraint and the COI maximum RoCoF constraint, are formulated in the UC model.

1 Claim, 13 Drawing Sheets

ROCOF CONSTRAINED UNIT COMMITMENT CONSIDERING SPATIAL DIFFERENCE IN FREQUENCY DYNAMICS

BACKGROUND

Power system stability has been threatened by the penetration of large-scale renewable power generation (RPG) and the replacement of synchronous generators. The post-disturbance rate of change of frequency (RoCoF), which is one of the most important frequency stability indicators, increased in recent frequency instability events around the globe, as the result of system inertia decrement. A larger RoCoF will not only enlarge the frequency deviation, but also cause the tripping of distributed generation on RoCoF-based anti-islanding protection and the inadequate response of under frequency load shedding (UFLS), both of which will lead to frequency cascade collapse and power system blackout. Thus, it is crucial to mitigate the RoCoF for the sake of frequency stability.

SUMMARY

The post-disturbance RoCoF is an important index for low-inertia power system frequency stability. This disclosure describes an RoCoF constrained unit commitment model so as to enhance the frequency stability in operation time-scale, where the spatial difference in frequency dynamics is considered and the RoCoF constraint is enforced for each node. The maximum of node RoCoF can be approximated by two terms, i.e., the initial post-disturbance node RoCoF and the maximum of the center of inertia (COI) RoCoF. Analytical expressions of the node initial RoCoF under typical disturbances are derived. Then, a tractable relationship between the node initial RoCoF and the working status of generators is obtained by the piecewise linearization approach. Simulation results carried out on the IEEE 39-bus system demonstrate the proposed model can limit the node RoCoF in an economic and accurate manner. The adaptability to renewable power generation and online application are also described.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

I. Introduction

During the post-disturbance frequency dynamics, the maximum RoCoF occurs in a short time right after the disturbance. Considering the dead-band setting and the response latency, post-disturbance supplementary control measures, such as the traditional primary frequency control and the virtual inertia (VI) response, may not have the chance to remedy the maximum RoCoF. According to the basics of the power system dynamics, the early-stage of the post-disturbance frequency dynamics is dominated by the system inertia and the power flow distribution, where the latter also corresponds to the disturbance severity. Hence, it is promising to restrict the maximum RoCoF via the optimization of the power system operation strategies, i.e., unit commitment (UC), economic dispatch (ED), and optimal power flow (OPF). Among those, optimizing the UC strategy has attracted the greatest attention, due to the fact that it could simultaneously modulate the system inertia, through changing the on/off status of generators, and the power flow distribution, by tuning the base-case operating point.

Figure 1:
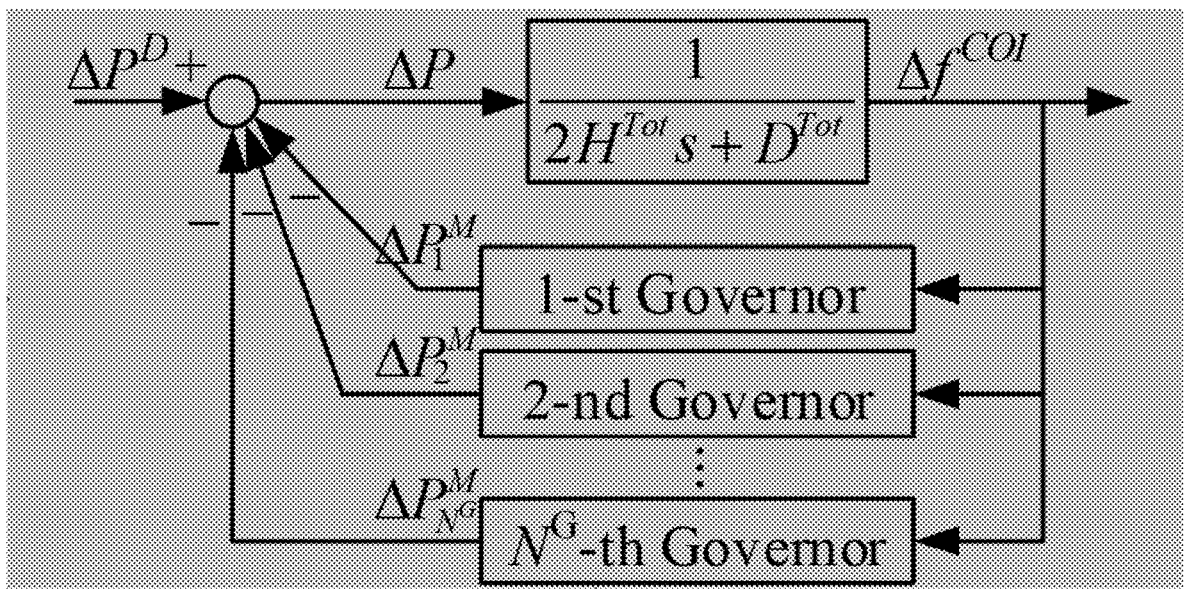
FIG. 1 shows an exemplary block diagram of SFR model according to an example embodiment.

In order to establish the link between the UC strategy and the maximum RoCoF, the analytical expression of the maximum RoCoF should be derived, where the system frequency response (SFR) model and its multiple variations are most frequently adopted. FIG. 1 shows an exemplary block diagram of SFR model according to an example embodiment. The basic framework of the SFR model is shown in FIG. 1, where only the generator rotor motion and governor, which are the main contributors to the system frequency dynamics, are preserved. The core of this model is that the center of inertia (COI) frequency dynamics can be selected as the representative of power system frequency dynamics, and the power system is simplified to an aggregated generator. At this stage, the post-disturbance COI maximum RoCoF can be easily obtained by dividing the disturbance active power by the system total inertia, i.e., $\Delta P^D / 2H^{Tol}$. The maximum RoCoF constraint can be directly added to the UC problem, which is linear with respect to the working status of generators.

Along this line, many inspiring research works have been carried out. For example, the RoCoF constrained UC is proposed, where the electricity market dispatch is optimized on the premise of frequency stability. Considering the diversity of system inertia providers, RoCoF constraints including the synchronous condenser, VI from battery energy storage, high voltage direct current (HVDC), and wind turbine, are established. Further, the RoCoF constrained UC model is extended to the scenario considering uncertainties, e.g., stochastic UC, two-stage chance-constrained UC, and robust-formulated UC. However, due to the inherent deficiency of SFR-based models, the frequency spatial differences in the post-disturbance stage cannot be reflected, and the disturbance type is limited to active power decrement/increment.

In fact, the COI may not correspond to any node of the power system, and the protection as well as control devices triggered by RoCoF relay are inherently configured at certain nodes. That is, even if the COI maximum RoCoF is satisfactory, the RoCoF of some nodes may still go beyond the limit, which would cause the power system frequency collapse. Therefore, the RoCoF constraints should be enforced at the nodes where the RoCoF relays are configured, which suggests the frequency spatial difference should be taken into account. Since the node frequency dynamics is described by a set of coupled differential and algebraic equations, the node maximum RoCoF, which may not occur right after the disturbance, and it can only be obtained by the numerical method. Recently proposed frequency divider formula offers a linear model to describe the node frequency dynamics. However, it can only be used to analyze the frequency spatial correlation in a single numerical time step and the frequency dynamics is over-linearized for online applications, where the real-time rather than the accuracy is preferred.

To formulate an accurate and tractable expression for the node RoCoF, many pioneer efforts have been made. Considering the frequency dynamics coherency, the area frequency dynamics, instead of the node frequency dynamics, is adopted to derive the RoCoF constraint. The closed-form expression of area COI RoCoF is deduced based on the multi-area SFR model, and decomposed into the system COI component and the areal oscillation component, where the latter is linearized by numerical estimation for the sake of model tractability. Another form of the area RoCoF expression concludes that the maximum RoCoF of one area can be directly obtained based on the area total inertia when the disturbance occurs in the same one, while that should be calculated and linearized when the disturbance is in another. The concept of "area" in some references is only applicable to power systems with long-distance tie-lines, and the frequency spatial difference within each "area" still cannot be reflected.

In this disclosure, the RoCoF constrained UC considering spatial difference in frequency dynamics is described, so as to confine the maximum of the post-disturbance node RoCoF. This is the first work to improve the early-stage of the post-disturbance node frequency dynamics through optimizing UC decisions. The comparison with the characteristics of existing methods, which are reviewed above, is summarized in Table 1. Compared with the existing works, the salient features of this work are threefold.

First, the analytical expressions of the node initial RoCoF after the disturbance are derived, where the disturbance types consist of the load, the line switching, and the generator turbine disturbances. The location and the severity of the disturbance are also considered in the derived post-disturbance node initial RoCoF expressions.

Second, due to the time scale difference, the UC decision variables, including the working status and base-case operating points of generators, are not explicitly presented in the derived node initial RoCoF expressions. Then, the node initial RoCoF expressions are reformulated, where the impacts of the UC decision variables are explicitly shown. Next, the complex relationship between the node initial RoCoF and the UC decision variables are linearized in a mixed integer linear form.

Third, the node RoCoF constrained UC model is established, where both the derived node initial RoCoF expressions and the COI maximum RoCoF formula are incorporated to restrict the maximum RoCoF of the critical nodes. The computation burden of the proposed UC model is adjustable by altering the RoCoF constraint linearization accuracy. Simulation results validate the effectiveness and the economy of the described UC model over the mainstream COI RoCoF constrained ones.

TABLE I

COMPARISON WITH EXISTING METHODS

| Ref. | Year | RoCoF spatial scale | System modeling | Disturbance type | RPG consideration |
| --- | --- | --- | --- | --- | --- |
| [10] | 2005 | COI RoCoF | SFR model | System total active power imbalance, e.g, largest generator outage or load sudden change | None |
| [15] | 2022 | | | | VI from wind turbine |
| [16] | 2016 | | | | VI and fast frequency response from wind turbine |
| [20] | 2018 | | | | Wind uncertainty |
| [21] | 2021 | | | | VI from wind turbine and wind uncertainty |
| [28], [29] | 2021 | Area COI RoCoF | Multi-area SFR model | | Wind uncertainty |
| [30] | 2020 | | | | None |
| Proposed | / | Node RoCoF | Unsimplified power system model | Load, line switching, and generator turbine disturbances | Applicable |

II. Derivation of Node Initial RoCoF Expression

Figure 2:
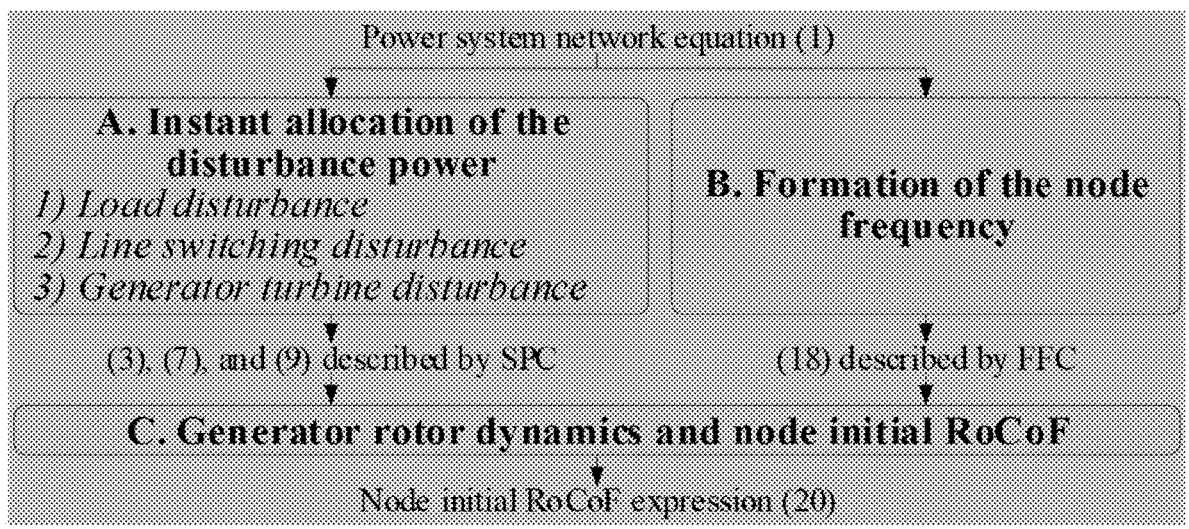
FIG. 2 shows exemplary determination of post-disturbance node initial RoCoF according to an exemplary embodiment of the present disclosure.

The post-disturbance node initial RoCoF is determined by three physical processes: the instant allocation of the disturbance power, the formation of the node frequency, and the generator rotor dynamics. FIG. 2 shows exemplary determination of post-disturbance node initial RoCoF according to an exemplary embodiment of the present disclosure. As shown in FIG. 2, those processes would be discussed separately, and the node initial RoCoF expression would be given. The assumptions considered in the following formulation include: Considering the RoCoF and frequency dynamics time scale, the power system lumped models are adopted. The disturbance power remains constant after the disturbance, especially for the maximum RoCoF time scale, which is a common assumption in frequency dynamics analysis. The distortion in frequency at the disturbance instant is ignored, which conforms to the field implementation of RoCoF or frequency relays since the well-designed filter is adopted.

A. INSTANT ALLOCATION OF THE DISTURBANCE POWER

While a disturbance occurs, all the synchronized generators would jointly pick up the disturbance power instantly. The instant allocation principles of the disturbance power under three typical disturbances, which are the load disturbance, the line switching disturbance, and the generator turbine disturbance, are derived.

Figure 3:
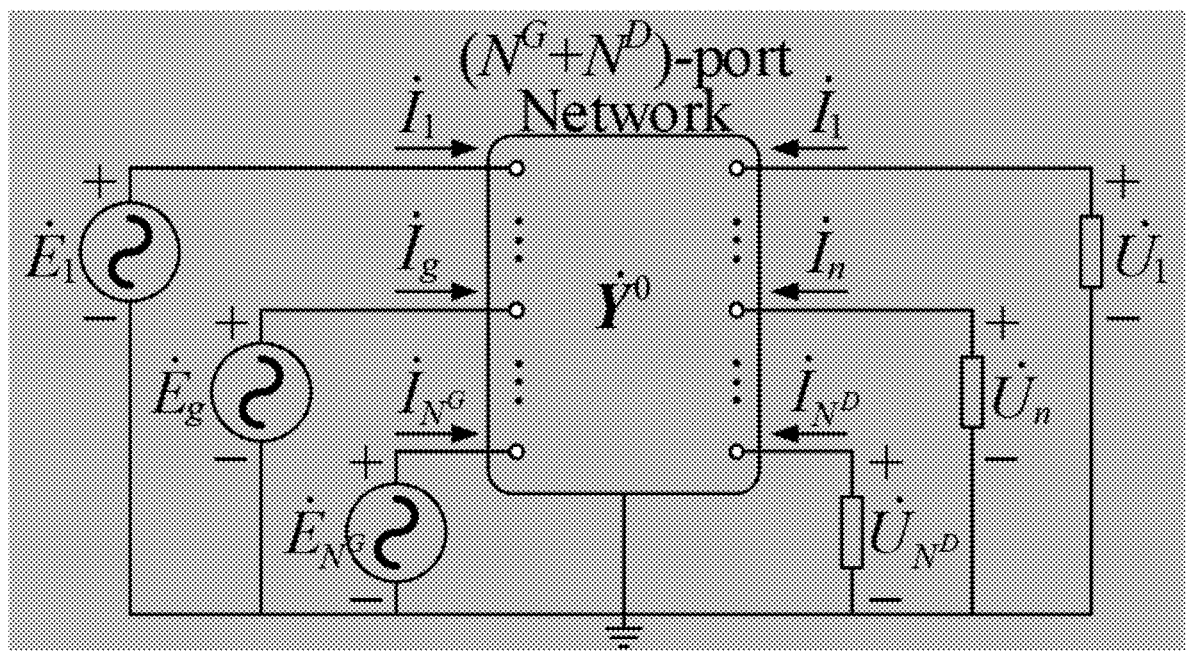
FIG. 3 shows an exemplary network topology according to an exemplary embodiment of the present disclosure.

1) Load Disturbance: The original network topology and equation of the power system with $N^G$ generators and $N^D$ nodes are shown in FIGS. 3 and (1), respectively, where the generator transient reactance is augmented and the generator internal electromotive force (EMF) serves as the boundary of the power network. FIG. 3 shows an exemplary network topology according to an exemplary embodiment of the present disclosure.

$$\begin{bmatrix} \dot{I}^G \\ \dot{I}^D \end{bmatrix} = \begin{bmatrix} \dot{Y}^{0,GG} & \dot{Y}^{0,GD} \\ \dot{Y}^{0,DG} & \dot{Y}^{0,DD} \end{bmatrix} \begin{bmatrix} \dot{E} \\ \dot{U} \end{bmatrix}, \quad (1)$$

where $\dot{I}^G \in \mathbb{C}^{N^G \times 1}$ and $\dot{I}^D \in \mathbb{C}^{N^D \times 1}$ are the injected current phasors from the generator EMF and node, respectively; $\dot{E} \in \mathbb{C}^{N^G \times 1}$ and $\dot{U} \in \mathbb{C}^{N^D \times 1}$ are the voltage phasors of the generator EMF and node, respectively; parameters characterized by $\dot{Y}^0$ represents the submatrices of network admittance matrix; the elements of above phasors can be written as $\dot{E}=Ee^{j\delta}$, $\dot{U}=Ue^{j\theta}$, and $\dot{Y}^0=Y^0e^{j\gamma^0}$.

Figure 4:
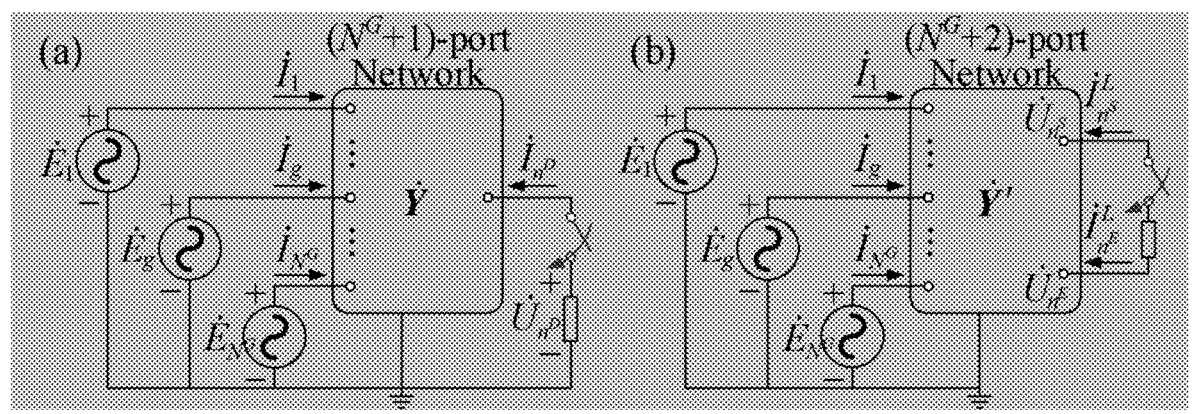
FIG. 4 shows exemplary equivalent network topologies according to an exemplary embodiment of the present disclosure.

The load disturbance refers to the increment or decrement of load active power. FIG. 4 shows exemplary equivalent network topologies according to an exemplary embodiment of the present disclosure. Based on FIG. 3, the equivalent network topology for load disturbance analysis is shown in FIG. 4(a), where the load equivalent admittance are augmented and the disturbed load at the $n^D$-th node is highlighted. The corresponding network equation is given (2), where only the $n^D$-th node is reserved.

$$\begin{bmatrix} \dot{I}^G \\ \dot{I}^D_{n^D} \end{bmatrix} = \begin{bmatrix} \dot{Y}^{GG} & \dot{Y}^{GD}_{n^D} \\ \dot{Y}^{DG}_{n^D} & \dot{Y}^{DD}_{n^D,n^D} \end{bmatrix} \begin{bmatrix} \dot{E} \\ \dot{U}_{n^D} \end{bmatrix}, \quad (2)$$

where $\dot{I}_{n^D}^D$ is the injected current phasor from the $n^D$-th node; $\dot{U}_{n^D}$ is the voltage phasor of the node; $\dot{Y}$ is derived from $\dot{Y}^0$ in (1) by simple mathematical operation and represents the equivalent network admittance matrix for load disturbance analysis, and it should be noted that the equivalent admittances of all loads other than $n^D$-th load are contained in $\dot{Y}^0$.

Assume the disturbance power of the disturbed load is $\Delta P_{n^D}^D$, the disturbance power $\Delta P_g^{G,0}$ picked up by the g-th generator can be expressed as (3) where $S_{g,n^D}^D$ is the well-known synchronizing power coefficient (SPC) between disturbed load and generator.

$$\Delta P_g^{G,0} = S_{g,n^D}^D \Delta P_{n^D}^D \quad (3a)$$

$$S_{g,n^D}^D = \frac{E_g U_{n^D} Y_{g,n^D}^{GD} \sin(\delta_g - \theta_{n^D} - \gamma_{g,n^D}^{GD})}{\sum_{g^B} E_{g^B} U_{n^D} Y_{g^B,n^D}^{GD} \sin(-(\delta_{g^B} - \theta_{n^D}) - \gamma_{g^B,n^D}^{GD})} \quad (3b)$$

$$Y_{g,n^D}^{GD} e^{j\gamma_{g,n^D}^{GD}}$$

In (3), $E_g e^{j\delta_g}$ is the g-th element of $\dot{E}$, i.e., the generator EMF of the g-th generator; is g-th element of $\dot{Y}_{n^D}^{GD}$, i.e., the equivalent admittance between the g-th generator and $n^D$-th node.

As a simple explanation, the numerator of (3b) is the electrical distance between the g-th generator and $n^D$-th node, and the denominator is the sum of electrical distances between all generators and $n^D$-th node. It can be seen that the SPC is related to the system topology as well as parameters and the operating point.

2) Line Switching Disturbance: It includes both the planned and the unplanned switching on/off of transmission lines, which would lead to the power flow reallocation and the incoherent change of node frequencies. Also based on FIG. 3 and (1) the equivalent network topology for line switching disturbance analysis is shown in FIG. 4(b) and the corresponding network equation is described by (4). All loads are also augmented, and the $l^L$-th disturbed line with two terminals connected to the $n^S$-th and $n^E$-th nodes is underlined.

$$\begin{bmatrix} \dot{I}^G \\ \dot{I}_{n^S}^L \\ \dot{I}_{n^E}^L \end{bmatrix} = \begin{bmatrix} \dot{Y}'^{GG} & \dot{Y}'^{GD}_{n^S} & \dot{Y}'^{GD}_{n^E} \\ \dot{Y}'^{DG}_{n^S} & \dot{Y}'^{DD}_{n^S,n^S} & \dot{Y}'^{DD}_{n^S,n^E} \\ \dot{Y}'^{DG}_{n^E} & \dot{Y}'^{DD}_{n^S,n^E} & \dot{Y}'^{DD}_{n^E,n^E} \end{bmatrix} \begin{bmatrix} \dot{E} \\ \dot{U}_{n^S} \\ \dot{U}_{n^E} \end{bmatrix}, \quad (4)$$

where $\dot{I}_{n^S}^L$ and $\dot{I}_{n^E}^L$ are the current phasors injected from the two terminals of the disturbed line; $\dot{U}_{n^S}$ and $\dot{U}_{n^E}$ are the voltage phasors of the two terminals of the disturbed line; the equivalent network admittance matrix $\dot{Y}'$ corresponds to line switching disturbance and can be simply derived from $\dot{Y}^0$.

Further, the subnetwork related to the active power as well as the phase angle is extracted from (4) and linearized as follows $$\begin{bmatrix} \Delta P^G \\ \Delta P_{n^S}^L \\ \Delta P_{n^E}^L \end{bmatrix} = \begin{bmatrix} L^{GG} & L_{n^S}^{GD} & L_{n^E}^{GD} \\ L_{n^S}^{DG} & L_{n^S,n^S}^{DD} & L_{n^S,n^E}^{DD} \\ L_{n^E}^{DG} & L_{n^E,n^S}^{DD} & L_{n^E,n^E}^{DD} \end{bmatrix} \begin{bmatrix} \Delta \delta \\ \Delta \theta_{n^S} \\ \Delta \theta_{n^E} \end{bmatrix}, \quad (5)$$

where $\Delta P^G \in \mathbb{R}^{N^G \times 1}$, $P_{n^S}^L$, and $P_{n^E}^L$ are the active power injected from the generator EMF and the two terminals of disturbed line, respectively; $\Delta\delta \in \mathbb{R}^{N^G \times 1}$ $\theta_{n^S}$, and $\theta_{n^E}$ are the phase angle of $\dot{E}$, $\dot{U}_{n^S}$, and $\dot{U}_{n^E}$, respectively; parameters characterized by L are the linearization coefficients between active power and phase angle. Considering that the phase angle of generator EMF remains unchanged at the initial time after disturbance, i.e., $\Delta\delta = 0_{N^G \times 1}$, (5) can be transformed as (6), where the active power of interest is retained.

$$\Delta P^G = \begin{bmatrix} L_{nS}^{GD} & L_{nE}^{GD} \end{bmatrix} \begin{bmatrix} L_{nS,nS}^{DD} & L_{nS,nE}^{DD} \\ L_{nE,nS}^{DD} & L_{nE,nE}^{DD} \end{bmatrix}^{-1} \begin{bmatrix} \Delta P_{nS}^L \\ \Delta P_{nE}^L \end{bmatrix}. \quad (6)$$

As the line resistance can be ignored, the line power satisfies $\Delta P_{nS}^L \approx -\Delta P_{nE}^L := \Delta P_l^L$, where the last term represents the disturbance power of the line disturbance. The disturbance power picked up by the g-th generator can be expressed in the form similar to (3), where $S_{g,l}^{L}$ is the extended SPC of the line switching disturbance.

$$\Delta P_g^{G,0} = S_{g,l}^L \Delta P_l^L \quad (7a)$$

$$S_{g,l}^L = \frac{\begin{pmatrix} L_{g,nS}^{GD} L_{nS,nE}^{DD} + L_{g,nS}^{GD} L_{nE,nE}^{DD} \\ -L_{nS,nS}^{DD} L_{g,nE}^{GD} - L_{nE,nS}^{D} L_{g,nE}^{GD} \end{pmatrix}}{L_{nS,nE}^{DD} L_{nE,nS}^{DD} - L_{nS,nS}^{DD} L_{nE,nE}^{DD}} \quad (7b)$$

In (7), $L_{g,nS}^{GD}$ is the g-th element of $L_{nS}^{GD}$, and the detailed expressions of parameters characterized by L are as follows $$L_{g,nS}^{GD} = E_g U_{nD} Y'_{g,nS}^{GD} \sin(\delta_g - \theta_{nD} - \gamma'_{g,nS}^{GD}), \quad (8a)$$

$$L_{g,nE}^{GD} = E_g U_{nE} Y'_{g,nE}^{GD} \sin(\delta_g - \theta_{nE} - \gamma'_{g,nE}^{GD}), \quad (8b)$$

$$L_{nS,nS}^{DD} = -\sum_{g^B} E_{g^B} U_{nS} Y'_{g^B,nS}^{GD} \sin(-(\delta_{g^B} - \theta_{nS}) - \gamma'_{g^B,nS}^{GD}) - \quad (8c)$$

$$U_{nS} U_{nE} Y'_{nS,nE}^{DD} \sin(\theta_{nS} - \theta_{nE} - \gamma'_{nS,nE}^{DD}),$$

$$L_{nS,nE}^{DD} = U_{nS} U_{nE} Y'_{nS,nE}^{DD} \sin(\theta_{nS} - \theta_{nE} - \gamma'_{nS,nE}^{DD}), \quad (8d)$$

$$L_{nE,nS}^{DD} = U_{nS} U_{nE} Y'_{nS,nE}^{DD} \sin(-(\theta_{nS} - \theta_{nE}) - \gamma'_{nS,nE}^{DD}), \quad (8e)$$

$$L_{nE,nE}^{DD} = -\sum_{g^B} E_{g^B} U_{nE} Y'_{g^B,nE}^{GD} \sin(-(\delta_{g^B} - \theta_{nE}) - \gamma'_{g^B,nE}^{GD}) - \quad (8f)$$

$$U_{nS} U_{nE} Y'_{nS,nE}^{DD} \sin(-(\theta_{nS} - \theta_{nE}) - \gamma'_{nS,nE}^{DD}).$$

It can be seen that parameters L are related to the electrical distance between the generator and two terminals of the switched line, which leads to SPC of line switching disturbance having the same property as that of load disturbance, i.e., it is related to system topology, parameters, and operating point.

3) Generator Turbine Disturbance: It refers to the mechanical power increment/decrement of the generator turbine, i.e., the turbine fast valving. Since the phase angle of the generator EMF remains unchanged right after the disturbance, only the generator whose turbine is disturbed can pick up the disturbance power. At this stage, the power system network characteristics can be ignored and the form of SPC is quite simple. Considering that the disturbance power of the $g^T$-th disturbed generator is $\Delta P_{g^T}^D$, the extended SPC $S_{g,g^T}^T$ of turbine disturbance can be expressed as (9), whose form is consistent with (3) and (7).

$$\Delta P_g^{G,0} = S_{g,g^T}^T \Delta P_{g^T}^T \quad (9a)$$

$$S_{g,g^T}^T = \begin{cases} 1, & g = g^T \\ 0, & g \neq g^T \end{cases} \quad (9b)$$

In (9), the SPC is made up of constant values and equal to 1 only the disturbed generator is concerned.

B. FORMATION OF THE NODE FREQUENCY

Figure 5:
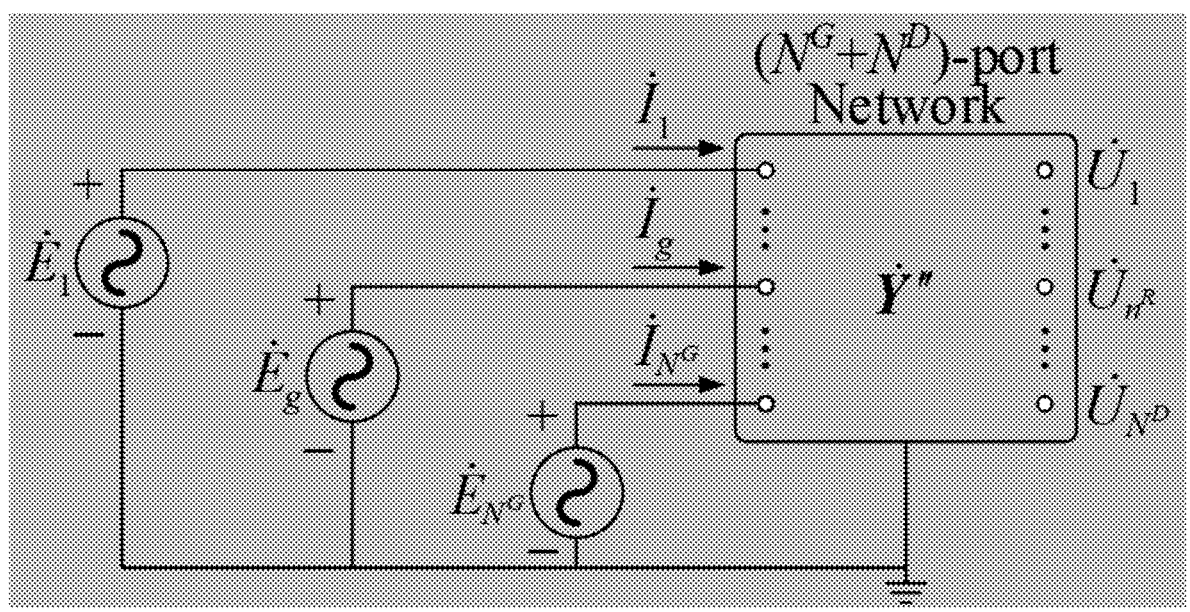
FIG. 5 shows exemplary equivalent network topology for node frequency formation analysis accordingly to an exemplary embodiment of the present disclosure.

Notably, the node frequency is determined by the rotor speeds of all the synchronized generators in the power system. FIG. 5 shows exemplary equivalent network topology for node frequency formation analysis accordingly to an exemplary embodiment of the present disclosure. Similar to Section II.A, the derivation of the node frequency starts from the equivalent network topology, as shown in FIG. 5, and the power system network equation (10), where all loads are augmented and all nodes are retained compared with FIG. 3 and (1).

$$\begin{bmatrix} \dot{I}^G \\ 0_{N^D \times 1} \end{bmatrix} = \begin{bmatrix} \dot{Y}''^{GG} & \dot{Y}''^{GD} \\ \dot{Y}''^{DG} & \dot{Y}''^{DD} \end{bmatrix} \begin{bmatrix} \dot{E} \\ \dot{U} \end{bmatrix} \quad (10)$$

In (10), the current phasor injected from node is $0_{N^D \times 1}$ compared with (1) considering the augmentation of loads; it should be noted that the admittance matrix with superscript $\{\cdot\}''$ is different from $\dot{Y}$ in (2) and $\dot{Y}'$ in (4). The node voltage can be expressed by the generator EMFs of all the generators as follows:

$$U \dot{U} = -(\dot{Y}''^{DD})^{-1} \dot{Y}''^{DG} \dot{E} := \dot{B}\dot{E}, \quad (11)$$

where $\dot{B} \in \mathbb{C}^{N^D \times N^G}$ is named as the voltage formation coefficient matrix. For the $n^R$-th node, the $n^R$-th row of (11) is expressed as $$\dot{U}_{n^R} = \sum_g \dot{B}_{n^R,g} \dot{E}_g, \quad (12)$$

$$\dot{B}_{n^R,g} = B_{n^R,g} e^{j\beta_{n^R,g}}$$

where is the element in the $n^R$-th row and g-th column of $\dot{B}$.

In the phasor analysis, the frequency is obtained from the phase angle. Define the phasor $\dot{X} = Xe^{j\varphi}$ changes over time and assume that the phase angle is continuous with respect to time,j as follows:

$$\varphi = \int^N \Delta f dt + \varphi^0, \quad (13)$$

where $\varphi$ and $\varphi^0$ are the real-time and initial phase angles, respectively; $\Delta f$ is the rotation speed of phasor $\dot{X}$, i.e., the frequency. According to the third assumption, it should be noted that the distortion in phase angle at the disturbance instant is ignored, and the frequency is considered continuous. The derivative of $\dot{X}$ can be expressed as:

$$p\dot{X} = e^{j\varphi} pX + jXe^{j\varphi} f^N \Delta f, \quad (14)$$

where $p(\cdot)$ represents $d(\cdot)/dt$.

$$\dot{U}_{n^R} = U_{n^R} e^{j\theta_{n^R}}$$

Similar to phasor $\dot{X}$, the generator EMF $\dot{E}_g = E_g e^{j\delta_g}$ and node voltage in (12) can also be regarded as changing over time. $\delta_g = \int^N \Delta f_g^G dt + \delta_g^0$ and $\theta_{n^R} = \int^N \Delta f_{n^R}^D dt + \theta_{n^R}^0$ are satisfied, where $\Delta f_g^G$ and $\Delta f_{n^R}^D$ are the frequencies of the g-th generator EMF (i.e., rotor speed) and $n^R$-th node. The derivatives of above two phasors are as follows $$p\dot{E}_g = jE_g e^{j\delta_g} f^N \Delta f_g^G, \quad (15a)$$

$$p\dot{U}_{n_R} = e^{j\theta_{n_R}} pU_{n_R} + jU_{n_R} e^{j\theta_{n_R}} f^N \Delta f_{n_R}^D, \quad (15b)$$

where the amplitude $E_g$ of the generator EMF is considered constant, i.e., $pE_g=0$.

Take the derivative of (12) and substitute (15) into it:

$$e^{j\theta_{n_R}} pU_{n_R} + jU_{n_R} e^{j\theta_{n_R}} f^N \Delta f_{n_R}^D = \sum_g B_{n_R,g} jE_g e^{j(\delta_g + \beta_{n_R,g})} f^N \Delta f_g^G, \quad (16)$$

Divide both sides of (16) by $e^{j\theta_{n_R}}$, and obtain:

$$pU_{n_R} + jU_{n_R} f^N \Delta f_{n_R}^D = \sum_g B_{n_R,g} jE_g e^{j(\delta_g - \theta_{n_R} + \beta_{n_R,g})} f^N \Delta f_g^G. \quad (17)$$

The second term on the left side of (17) contains the node frequency $\Delta f_{n_R}^D$ and is purely imaginary. Using Euler Formula to expand the right side of (17) and taking the imaginary part, the expression describing the formation of node frequency is as follows:

$$\Delta f_{n_R}^D = \sum_g F_{n_R,g} \Delta f_g^G, \quad (18a)$$

$$F_{n_R,g} = \frac{E_g}{U_{n_R}} B_{n_R,g} \cos(\delta_g - \theta_{n_R} + \beta_{n_R,g}), \quad (18b)$$

where $F_{n_R,g}$ is named as frequency formation coefficient (FFC) for g-th generator.

(18) quantitatively represents the contribution of generator rotor speeds to the node frequency. It should be noted that FFC is also related to the system topology, parameters, and operating point.

C. GENERATOR ROTOR DYNAMICS AND NODE INITIAL ROCOF

Once the generator picks up the disturbance power, its rotor speed begins to change according to the swing equation. For the g-th generator, the initial rate of change of rotor speed is as follows:

$$p\Delta f_g^{G,0} = -\frac{\Delta P_g^{G,0}}{2H_g} \quad (19)$$

where $H_g$ is the generator inertia.

Substituting (3) and (18) into (19), the node initial RoCoF expression of the load disturbance can be obtained as:

$$RoCoF^0 := p\Delta f_{n_R}^{D,0} = -\sum_g \frac{F_{n_R,g} S_{g,n^D}^D}{2H_g} \Delta P_{n^D}^D, \quad (20)$$

where the detailed expression of FFC $F_{n,g}$ and SPC $S_{g,n^D}^D$ are shown in (18b) and (3b), respectively. The expressions of the line switching disturbance and the turbine disturbance are similar to (20), where SPC $S_{g,n^D}^D$ of the load disturbance should be replaced by $S_{g,l}^L$ in (7) and $S_{g,g'}^T$ in (9), respectively.

From (20), the node initial RoCoF is determined by the SPCs, FFCs and inertia of all generators. For example, the closer the electrical distance from the disturbance location to the low-inertia generator, the larger the SPC between them, the more contribution of the low inertia, and the larger the node initial RoCoF.

Figure 6:
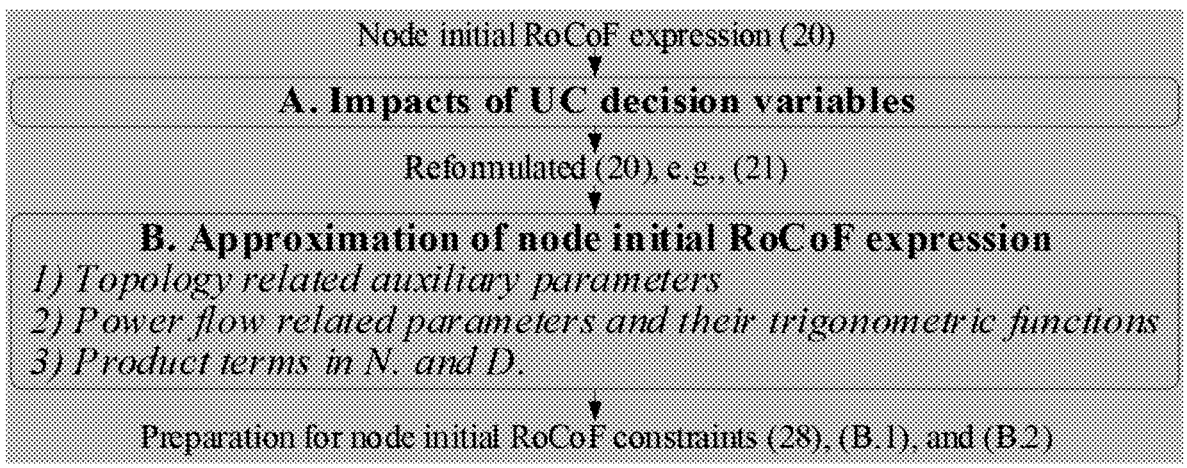
FIG. 6 shows exemplary steps according to exemplary embodiment of the present disclosure.

III. Tractable Node Initial RoCoF Expression with respect to UC Decision Variables Though the forms of the node initial RoCoF expression (20) and that of line switching disturbance and turbine disturbance seem neat, it is not readily to be added to the UC problem. The reason is that the UC decision variables, including the working status and operating points of generators, are not explicitly presented. FIG. 6 shows exemplary steps according to exemplary embodiment of the present disclosure. As shown in FIG. 6, the impacts of UC decision variables on the node initial RoCoF expression are discussed, then the tractable form for UC model could given after the tailored linearization treatment.

A. IMPACTS OF UC DECISION VARIABLES

From (20), considering that the disturbance power is predetermined, the node initial RoCoF is determined by the coefficients of the operating generators, including the FFC, the SPC, and the generator inertia, where the last coefficient is only related to the working status and relationship between the UC decision variables and the first two are much more complicated.

Notably, the impacts of the UC decision variables on the FFC and the SPC are also implicit, especially the working status of generators. For instance, there is no presence of the working status of generators in (3b), (7b) or (18b). In fact, the UC decision variables would affect the parameters in (3b), (7b) and (18b), and further influence the FFC and the SPC, where the impact chain is summarized in Table II. The topology related parameters could be expressed by the equivalent network admittance matrix, where the transient reactances of the online generators are augmented. Thus, the topology related parameters are determined by the working status of generators. Besides, the power flow related parameters should be updated along with the power flow solution, which could be known given the generator outputs.

TABLE II

IMPACTS OF THE UC DECISION VARIABLES ON FFC AND SPC

| Decision variables | Parameters in FFC and SPC | Type |
| --- | --- | --- |
| Generator working status | $Y^{GD}$ and $\gamma^{GD}$ in (3b)<br>$Y'^{GD}, \gamma'^{GD}, Y'^{DD}$ and $\gamma'^{DD}$ in (7b)<br>B and $\beta$ in (18b) | Topology related |
| Generator outputs | E, $\delta$, U and $\theta$ in (3b), (7b) and (18b) | Power flow related |

Taking the load disturbance as an example, the SPC and FFC in the node initial RoCoF expression (20) can be substituted by their detailed forms (3b) and (18b), then (20) can be equivalently reformulated as $$RoCoF^0 := p\Delta f_{n_R}^{D,0} = -\frac{N}{D} \Delta P_{n^D}^D, \quad (21a)$$

-continued $$N. = \sum_g \frac{E_g^2}{2H_g} \left( -A_{g,n_R,n_D}^{SS} \sin((\delta_g - \theta_{n_R}) \sin(\delta_g - \theta_{n_D}) + \right.$$
$$A_{g,n_R,n_D}^{CS} \cos(\delta_g - \theta_{n_R}) \sin(\delta_g - \theta_{n_D}) + A_{g,n_R,n_D}^{SC}$$
$$\sin(\delta_g - \theta_{n_R}) \cos(\delta_g - \theta_{n_D}) - A_{g,n_R,n_D}^{CC} \cos(\delta_g - \theta_{n_R}) \cos(\delta_g - \theta_{n_D}) \right), \quad (21b)$$

$$D. = U_{n_R} \sum_g E_g \left( -A_{g,n_D}^{S} \sin(\delta_g - \theta_{n_D}) - A_{g,n_D}^{C} \cos(\delta_g - \theta_{n_D}) \right), \quad (21c)$$

where N. and D. are auxiliary notations for the numerator and the denominator of the UC decision variable related aggregated coefficient, respectively. In (21b) and (21c), the topology and power flow related parameters are separated, respectively, and the phase angle difference related terms are retained. The notations $A_{\{\cdot\}}^{\{\cdot\}}$ represent the topology related auxiliary parameters, whose expressions are as follows $$A_{g,n_R,n_D}^{SS} = B_{n_R,g} Y_{g,n_D}^{GD} \sin\beta_{n_R,g} \cos\gamma_{g,n_D}^{GD}, \quad (22a)$$

$$A_{g,n_R,n_D}^{CS} = B_{n_R,g} Y_{g,n_D}^{GD} \cos\beta_{n_R,g} \cos\gamma_{g,n_D}^{GD}, \quad (22b)$$

$$A_{g,n_R,n_D}^{SC} = B_{n_R,g} Y_{g,n_D}^{GD} \sin\beta_{n_R,g} \sin\gamma_{g,n_D}^{GD}, \quad (22c)$$

$$A_{g,n_R,n_D}^{CC} = B_{n_R,g} Y_{g,n_D}^{GD} \cos\beta_{n_R,g} \sin\gamma_{g,n_D}^{GD}, \quad (22d)$$

$$A_{g,n_D}^{S} = Y_{n_D,g}^{GD} \cos\gamma_{n_D,g}^{GD}, \quad (22e)$$

$$A_{g,n_D}^{C} = Y_{n_D,g}^{GD} \sin\gamma_{n_D,g}^{GD}. \quad (22f)$$

The reformulated node initial RoCoF expressions for the line switching disturbance and the turbine disturbance are provided in Appendix B for simplicity, whose forms are similar to (21).

B. APPROXIMATION OF NODE INITIAL ROCOF EXPRESSION

Combining (21) and (22), the relationship between the node initial RoCoF and the UC decision variables is not only partial-implicit but also nonlinear. To obtain a tractable and explicit expression, approximation should be performed on (21) and (22), which includes the following three aspects: the topology related auxiliary parameters $A_{\{\cdot\}}^{\{\cdot\}}$, the power flow related parameters and their trigonometric functions, and the product terms in N. and D.. As $A_{\{\cdot\}}^{\{\cdot\}}$ in (21) has taken the generator working status into consideration, which would be 0 if the generator is offline, therefore, the generator inertia $H_g$ can be treated as a constant.

1) Topology Related Auxiliary Parameters: Their explicit expressions with respect to the generator working status are hard to be obtained and highly nonlinear. This is because the calculation of the equivalent network admittance matrix $\dot{Y}/\dot{Y}'$ in (2)/(4) and the voltage formation coefficient matrix $\dot{B}_{in}$ in (11) requires product and inverse operations on the original power system network admittance matrix $\dot{Y}^0$ in (1).

To construct an explicit mapping between $A_{\{\cdot\}}^{\{\cdot\}}$ and the generator working status $u_g$, the most accurate way is to make the lookup table, namely to calculate the values of $A_{\{\cdot\}}^{\{\cdot\}}$ for each combination of $u_g$, where the values of $A_{\{\cdot\}}^{\{\cdot\}}$ should be calculated in advance. This can be described by the following if-then logic $$A_{\{\cdot\}}^{\{\cdot\}} = Y[u_g(\forall g \in \mathcal{G})]. \quad (23)$$

In (23), $Y[\cdot]$ represents the if-then logic and can be written as the mixed integer linear form, where $2^{N^G} \times \text{Card}(T)$ binary auxiliary variables need to be added to the UC model.

To decrease the number of auxiliary binary variables, a viable way is to make full use of the inherent binary variables of the UC problem, say the working status of generators $u_g$. Specifically, the piecewise linearization method is applied and $u_g$ is chosen as the segment indicator. Firstly, a group of generators are selected from G and forms the generator subset $G^S$ ($G^S \subset G$), and $\mathcal{P}$ is the set of working status combinations of generators in $G^S$. For a given combination $p \in \mathcal{P}$, $A_{\{\cdot\},p}^{\{\cdot\}}$ is determined by all the working status of generators in $\mathcal{G}^C$ ($G^C = G -$ $$A_{\{\cdot\},p}^{\{\cdot\}}$$

$G^S$) and described by con.1 in (24). is as accurate as (23), where the subscript $\{\cdot\}_p$ means the working status combination is given. In (24), con.2 give the piecewise linear approximation of $$A_{\{\cdot\},p}^{\{\cdot\}},$$

denoted as $$A_{\{\cdot\},p}^{\{\cdot\},Fit}.$$

The linear fitting coefficients $$\alpha_p^{g^C}$$

and $\alpha_p^0$ for combination p should be calculated according to the least square problem (24), where the least squared error between $$A_{\{\cdot\},p}^{\{\cdot\},Fit}$$

and $$A_{\{\cdot\},p}^{\{\cdot\}}$$

and is guaranteed.

$$\min_{\alpha_p^{g^C}, \alpha_p^0} (A_{\{\cdot\},p}^{\{\cdot\}} - A_{\{\cdot\},p}^{\{\cdot\},Fit})^2 \quad (24)$$

$$\text{con. 1 } A_{\{\cdot\},p}^{\{\cdot\}} = \gamma[u_g c(\forall g^c \in \mathcal{G}^c)]$$

$$\text{con. 2 } A_{\{\cdot\},p}^{\{\cdot\},Fit} = \sum_{g^c \in \mathcal{G}^c} \alpha_p^{g^c} u_g c + \alpha_p^0$$

Now, remove the assumption that p is given, the piecewise linear approximation of $A_{\{\cdot\}}^{\{\cdot\}}$ can be described by (25), where the con.2 in (25a) is extended to (25b). The linear fitting coefficients $\alpha^{g^c}$ and $\alpha^0$ under different working status combinations follow if-then logic.

$$A_{\{\cdot\},p}^{\{\cdot\},Fit} = \sum_{g^c \in \mathcal{G}^c} a^{g^c} u_g c + a^0 \quad (25a)$$

$$a^{g^c} = \Gamma^{g^c}[u_g s(\forall\, g^s \in \mathcal{G}^s)] \quad (25b)$$

$$a^0 = \Gamma^0[u_g s(\forall\, g^s \in \mathcal{G}^s)] \quad (25c)$$

In (25), $\Gamma^{g^c}[\cdot]$ and $\Gamma^0[\cdot]$ represent the if-then logic and can be written in the mixed integer linear form. In this way, the number of auxiliary binary variable decreases to $2^N \times$ Card (T). The mixed integer linear form of $\Gamma^{g^c}[\cdot]$ is illustrated in Appendix.A 1).

2) Power Flow Related Parameters and Their Trigonometric Functions: As the frequency dynamics has little to do with the voltage amplitudes, the direct current (DC) power flow model is adopted to calculate the power flow related parameters in (3b), (7b) and (18b). As for the trigonometric functions of the phase angle differences, the following approximations are employed, namely $\cos(\delta-\theta)=1$ and $\sin(\delta-\theta)=\delta-\theta$, considering that the values of the phase angle differences are relatively small. In addition, the product of phase angle difference terms can be ignored.

3) Product Terms in N. and D.: After the approximation of the previous two steps, all the leftover product terms in N. and D. are bilinear. Concretely, they are the products of binary variables and continuous variables, which could be accurately linearized by the Big-M method. The details are listed in Appendix.A 2).

IV. The Node RoCoF Constrained UC Model

A. NODE MAXIMUM ROCOF APPROXIMATION

Figure 7:
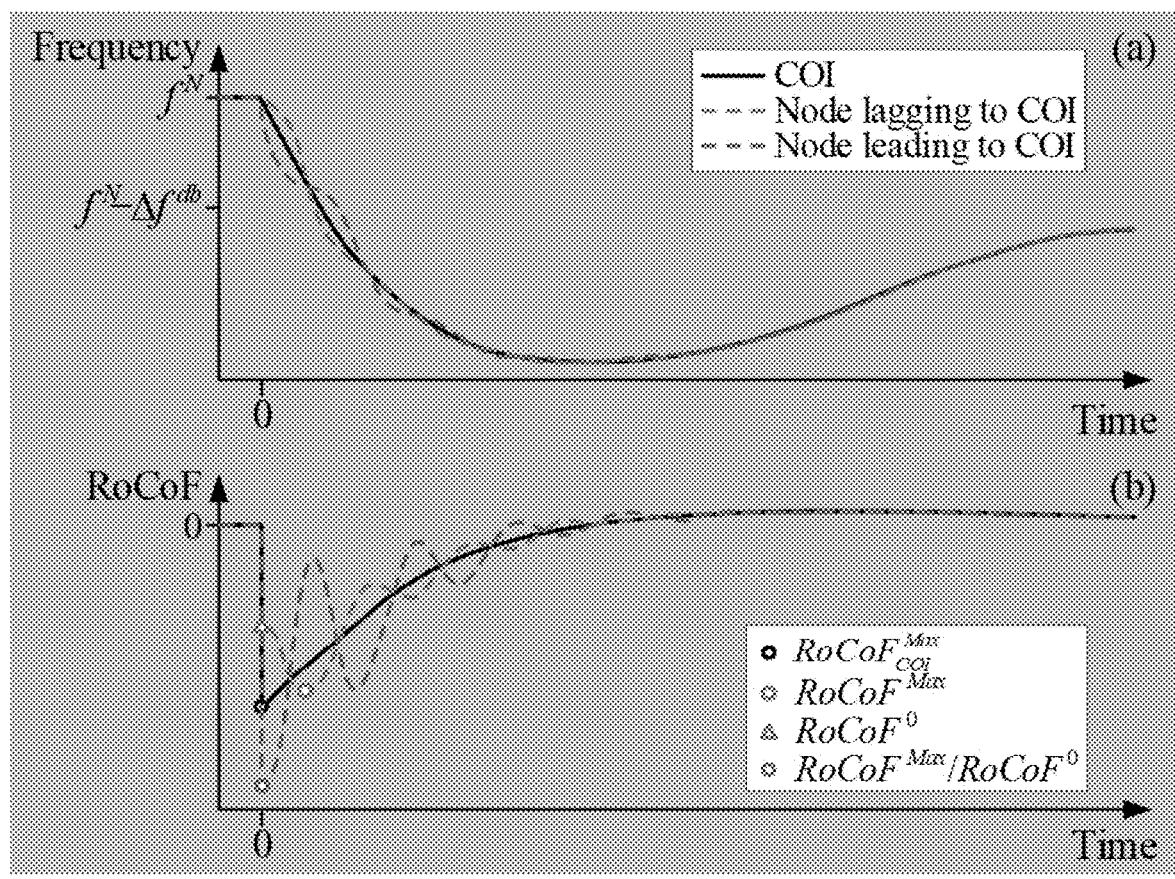
FIG. 7 shows exemplary post-disturbance (a) frequency and (b) RoCoF dynamics according to exemplary embodiments of present disclosure.

FIG. 7 shows exemplary post-disturbance (a) frequency and (b) RoCoF dynamics according to exemplary embodiments of present disclosure. The frequency dynamics after a typical disturbance, i.e., the increment of load active power at time 0, is shown in FIG. 7(a), where the frequencies of two types of nodes and COI are given. Considering the relative swing of generator phase angles, the node frequencies would oscillate around COI frequency according to the power system oscillation mode, especially when the frequencies are within the dead-band $\Delta f^{db}$ of governors. From the COI perspective, the node dynamics can be divided into two types, i.e., initially lagging and leading with respect to COI, which are usually corresponding to the nodes in high-inertia and low-inertia areas, respectively. It should be noted that the node frequency with leading mode would decrease rapidly after the disturbance, and the node frequency drop trend with lagging mode would be much milder.

The RoCoF dynamics corresponding to the frequencies in FIG. 7(a) and their maximum values are shown in FIG. 7(b). For the node leading to COI, its maximum RoCoF is equal to the post-disturbance initial RoCoF, while the node maximum RoCoF of the lagging node may not appear right after the disturbance. In this way, the node maximum RoCoF can only be obtained by solving the differential-algebraic equations (DAEs) of the power system electromechanical transient process, which is not only time-consuming but also not able to provide an analytical expression of the node maximum RoCoF with respect to the UC decision variables. In this regard, the maximum RoCoF of a lagging node can be approximated by the COI maximum RoCoF, which has been widely adopted in the existing RoCoF-constrained UC works. Then, the maximum RoCoF of any node could be formulated as $$\text{RoCoF}_{n^R,t}^{Max} = \max\{\text{RoCoF}_{n^R,t}^{d,0}, \text{RoCoF}_{COI,t}^{d,Max}, \forall d\}, \quad (26)$$

In general, (26) offers a conservative estimation about the maximum RoCoF of the lagging nodes, as the maximum RoCoF is usually lower than COI maximum RoCoF considering the power system damping effect. This would provide an additional safety margin for the UC strategies against serve disturbances and can appropriately avoid the mistrip of RoCoF-based relay due to various field errors, i.e., the RoCoF measurement error. Hence, the node maximum RoCoF constraint in the UC problem would take the form of $$\text{RoCoF}_{n^R,t}^{d,0} \leq \text{RoCoF}_{n^R}^{Lim}, \forall n^R, \forall d, \forall t, \quad (27a)$$

$$\text{RoCoF}_{COI,t}^{d,Max} \leq \text{RoCoF}_{n^R}^{Lim}, \forall n^R, \forall d, \forall t, \quad (27b)$$

where (27a) and (27b) are the constraints for node initial RoCoF and the COI maximum RoCoF, respectively. It should be noted that both (27a) and (27b) are applied to the node whose RoCoF needs to be constrained, and there is no need to distinguish which RoCoF dynamics characteristics the node belongs to. In addition, (27) is applicable to the power system with arbitrary inertia distribution levels.

Taking the load disturbance as an example, the detailed expression of (27a) is provided, which is $$\sum_g \left( \frac{1}{2H_g} \left( \sum_{g^C \in \mathcal{G}^C} a_{g,n^R,n^D,t}^{CS,g^C} u_{g,t}^C + a_{g,n^R,n^D,t}^{CS,0} \right) (\delta_{g,t} - \theta_{n^R,t}) + \right.$$

$$\left( \sum_{g^C \in \mathcal{G}^C} a_{g,n^R,n^D,t}^{SC,g^C} u_{g^C,t} + a_{g,n^R,n^D,t}^{SC,0} \right) (\delta_{g,t} - \theta_{n^D,t}) -$$

$$\left( \sum_{g^C \in \mathcal{G}^C} a_{g,n^R,n^D,t}^{CC,g^C} u_{g^C,t} + a_{g,n^R,n^D,t}^{CC,0} \right) \right) \Delta P_{n^D}^D \leq$$

$$\sum_g \left( -\left( \sum_{g^C \in \mathcal{G}^C} a_{g,n^R,n^D,t}^{S,g^C} s_{,t} + a_{g,n^R,n^D,t}^{S,0} \right)(\delta_{g,t} - \theta_{n^D,t}) - \right.$$

$$\left( \sum_{g^C \in \mathcal{G}^C} a_{g,n^R,n^D,t}^{C,C} u_{g^C,t} + a_{g,n^R,n^D,t}^{C,0} \right) \right) \text{RoCoF}_{n^R}^{Lim}, \forall n^R, \forall n^D, \forall t. \quad (28)$$

In (28), $\alpha_{\{\cdot\}}^{\{\cdot\}}$ is piecewise-linearly fitted according to $A_{\{\cdot\}}^{\{\cdot\}}$ in (22) and can be calculated by if-then logic as shown in (25); the big-M linearization for if-then logic is given in Appendix A (1); the bilinear product of the generator working status and phase angle can also be linearized by the big-M linearization as given in Appendix A (2). It should be noted that since the load equivalent admittance is augmented in the equivalent network admittance matrix $\dot{Y}/\dot{Y}'$ of (2)/(4) and the voltage formation coefficient matrix $\dot{B}$ of (11), $\alpha_{\{\cdot\}}^{\{\cdot\}}$ would change along with the load forecast results. The phase angle in (28) can be calculated by DC power flow model as follows:

$$\delta_{g,t} = \sum_{g^B} D_{g,g^B} P_{g^B,t}^G - \sum_n D_{g,n} P_{n,t}^D + X_g P_{g,t}^D, \forall g, \forall t, \quad (29a)$$

$$\theta_{n^R,t} = \sum_g D_{n^R,g} P_{g,t}^G - \sum_n D_{n^R,n} P_{n,t}^D, \forall n^R, \forall t, \quad (29b)$$

$$\theta_{n^D,t} = \sum_g D_{n^D,g} P_{g,t}^G - \sum_n D_{n^D,n} P_{n,t}^D, \forall n^D, \forall t, \quad (29c)$$

The node initial RoCoF constraints of the line switching and the turbine disturbances are given in Appendix B.

The expressions of COI maximum RoCoF constraints are much simpler, where the constraints under the load and the turbine disturbances are shown in (30a) and (30b), respectively.

$$\Delta P_{n^D}^D \leq 2 \sum_g H_g u_{g,t} RoCoF_{n^R}^{Lim}, \forall n^R, \forall n^D, \forall t \tag{30a}$$

$$\Delta P_{g^T}^T \leq 2 \sum_g H_g u_{g,t} RoCoF_{n^R}^{Lim}, \forall n^R, \forall g^M, \forall t \tag{30b}$$

It should be highlighted that the disturbed line with small resistance will not lead to the active power imbalance, if the whole power system is aggregated as a super node. Therefore, the COI maximum RoCoF after line switching disturbance is set as 0.

B. THE ROCOF CONSTRAINED UC MODEL

The objective function of the UC model is to minimize the summation of the generation costs and start-up/shut-down costs of generators, which is:

$$\min \sum_t \sum_g \left( C_g(P_{g,t}^G) + C_g^U z_{g,t}^U + C_g^D z_{g,t}^D \right), \tag{31a}$$

$$C_g(P_{g,t}^G) = C_g^{R2} P_{g,t}^{G\ 2} + C_g^{R1} P_{g,t}^G + C_g^{R0}. \tag{31b}$$

In addition to the node RoCoF constraints derived in Section IV.A, namely (28) and (30), the following constraints should also be considered in the UC problem, including: the active power steady-state balance constraint (32a), the spinning reserve constraint (32b), the generation capacity constraint (32c), the ramping constraints (32d) and (32e), the minimum on/off time constraints (32f) and (32g), the start-up/shut-down status constraints (32h) and (32i), and the transmission capacity constraint (32j).

$$\sum_g P_{g,t}^G = \sum_n P_{n,t}^D, \forall t \tag{32a}$$

$$\sum_g \left( u_{g,t} P_g^{G,Max} - P_{g,t}^G \right) \geq \rho \sum_n P_{n,t}^D, \forall t \tag{32b}$$

$$u_{g,t} P_g^{G,Min} \leq P_{g,t}^G \leq u_{g,t} P_g^{G,Max}, \forall g, \forall t \tag{32c}$$

$$P_{g,t}^G - P_{g,t-1}^G \leq u_{g,t-1} R_g^U + (1 - u_{g,t-1}) P_g^{G,Max}, \forall g, \forall t \tag{32d}$$

$$P_{g,t-1}^G - P_{g,t}^G \leq u_{g,t} R_g^D + (1 - u_{g,t}) P_g^{G,Max}, \forall g, \forall t \tag{32e}$$

$$-u_{g,t-1} + u_{g,t} - u_{g,k} \leq 0, \forall g, \forall t, k = t, \dots, t + T_g^{On} - 1 \tag{32f}$$

$$u_{g,t-1} - u_{g,t} + u_{g,k} \leq 1, \forall g, \forall t, k = t, \dots, t + T_g^{Of} - 1 \tag{32g}$$

$$-u_{g,t-1} + u_{g,t} \leq z_{g,t}^U, \forall g, \forall t \tag{32h}$$

$$u_{g,t-1} - u_{g,t} \leq z_{g,t}^D, \forall g, \forall t \tag{32i}$$

$$-P_l^{L,Cap} \leq \sum_g G_{l,g} P_{g,t}^G - \sum_n G_{l,n} P_{n,t}^D \leq P_l^{L,Cap}, \forall l, \forall t \tag{32j}$$

It should be noted that only the fundamental constraints of the UC problem are considered in this disclosure. If the RPG provides VI for the power system, the generator inertia parameter in the RoCoF constraint should be replaced by the VI setting value of the RPG, and the cost terms and operation constraints of the RPG should be added in the UC model.

There are several benefits to the exemplary embodiments of the present disclosure. The UC model can be applied to the power system to provide a day-ahead scheduling, e.g., the unit commitment. First, the future 24-hour operation data of the power system should be collected, including the power system topology and parameters, the forecasted load curves, the node RoCoF limitations, and the envisioned disturbances. Further, by substituting these collected data into the UC model and solving the UC model by optimization algorithm, the operating status and power output of the synchronous generators for the future 24 hours can be obtained. When the scheduling plan is arranged, the power system frequency stability in the future can be guaranteed, i.e., the post-disturbance node RoCoF will not exceed the limitation. This allows the power system to avoid the blackout caused by the RoCoF-based relay tripping.

V. Case Studies

A. DESCRIPTION OF THE TEST SYSTEM AND THE UC MODELS

Figure 8:
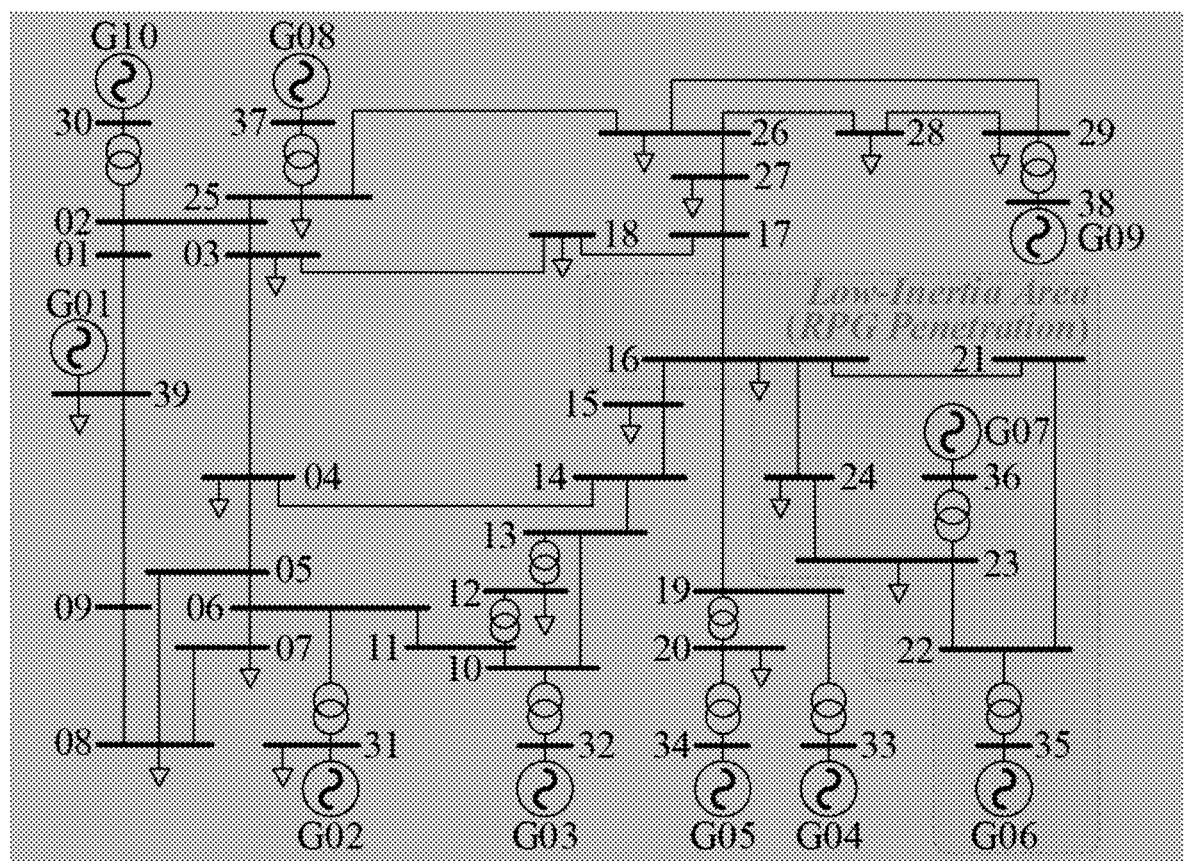
FIG. 8 shows exemplary topology of a modified IEEE 39-bus system according to an exemplary embodiment of the present disclosure.

FIG. 8 shows exemplary topology of a modified IEEE 39-bus system according to an exemplary embodiment of the present disclosure. The described model is validated by the modified IEEE 39-bus system, whose topology is shown in FIG. 8. The critical parameters of generators are summarized in Table III, which include the generation cost parameters and the inertia constants. The time resolution for the UC modeling is set as 1 hour. The simulations are performed on a PC with Intel(R) Xeon(R) E-2176G CPU @ 3.70 GHz and 64 GB memory. The UC models are implemented on MATLAB and solved by Gurobi 9.5. The actual post-disturbance frequency dynamics is simulated by solving the power system differential-algebraic equations on MATLAB. The RoCoF is calculated from node phase angle using the three-point differentiation method. Since the variable step solver is adopted, the time scale to obtain RoCoF ranges from about $10^{-4}$ ms to 10 ms, which means the calculated value represents the instant RoCoF after the disturbance.

TABLE III

GENERATOR PARAMETERS

| Gen. No | Generation Cost Coefficients | | | Inertia |
|---|---|---|---|---|
| | $C^{R2}$ (\$/p.u.2) | $C^{R1}$ (\$/p.u.) | $C^{R0}$ (\$) | H (s) |
| G01 | 1.9 | 3.4 | 899 | 11.6 |
| G02 | 1.8 | 3.3 | 898 | 11.6 |
| G03 | 2.0 | 3.5 | 900 | 11.6 |
| G04 | 20.1 | 25.1 | 1501 | 4.5 |
| G05 | 30.0 | 50.0 | 3000 | 11.6 |
| G06 | 15.0 | 20.0 | 1300 | 1.9 |
| G07 | 10.0 | 15.0 | 1000 | 1.7 |
| G08 | 2.1 | 3.6 | 901 | 11.6 |
| G09 | 2.2 | 3.7 | 902 | 11.6 |
| G10 | 20.00 | 25.0 | 1500 | 4.5 |

Compared with the original IEEE 39-bus system, the modification mainly lies in adjusting the system inertia distribution, as shown in Table III, where the inertia constants of G06 and G07 are significantly lower than the others to simulate the RPG penetration. At this stage, the modified IEEE 39-bus system can be divided into a high-inertia area and a low-inertia area, as marked in FIG. 8.

Figure 9:
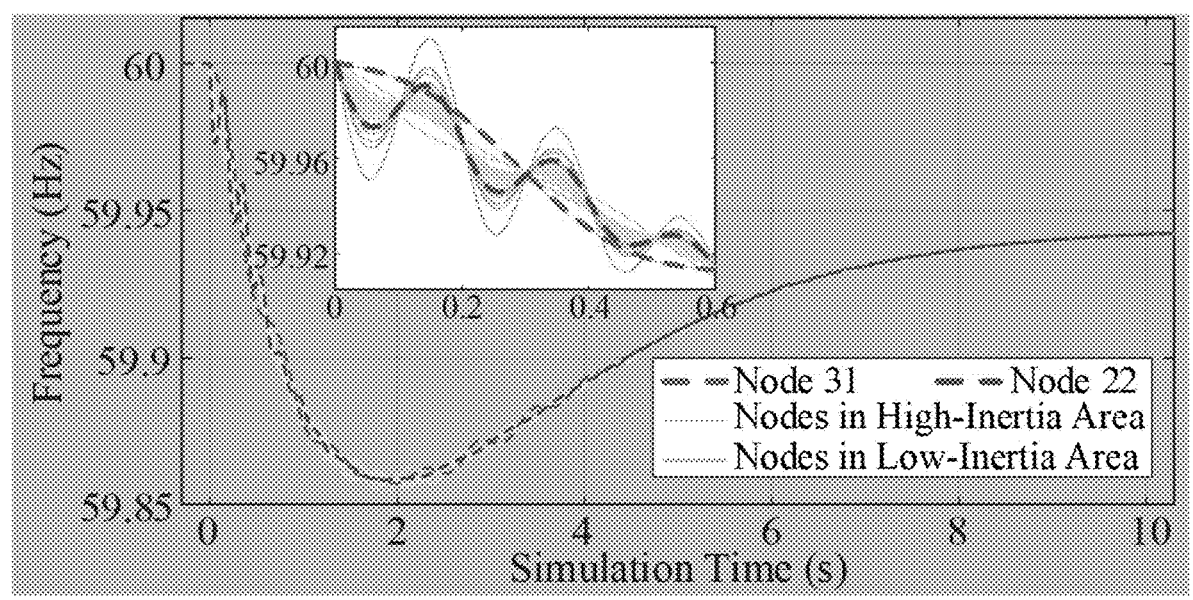
FIG. 9 shows exemplary post-disturbance frequency dynamics of the modified IEEE 39-bus system.

FIG. 9 shows exemplary post-disturbance frequency dynamics of the modified IEEE 39-bus system. Assume the active power of load connected at node 03 increases at 0 s, the frequency dynamics of the test system is shown in FIG.

9, where the frequencies measured at the above two areas are distinguished by different colors, from which the spatial difference of node frequencies can be observed. Specifically, the frequencies of nodes in the low-inertia area, i.e., node 22, decrease rapidly after the disturbance, while those in the high-inertia area, i.e., node 31, decrease in a milder fashion.

The described UC model is named as NUC, and the following three UC models are reproduced for comparison.

TUC: Delete the node maximum RoCoF constraints, including (28) and (29), in the NUC model.

CUC: Delete the node initial RoCoF constraint (28) in the NUC model, where the COI maximum RoCoF constraint is preserved to constrain the post-disturbance RoCoF.

NUCo: It is quite similar to the NUC model. The only difference is that the phase angle difference term in node initial RoCoF expression is linearized using a method proposed elsewhere. Taking the load disturbance as an example, the node initial RoCoF constraint is shown in (33), where the phase angle difference is considered to be 0, which leads to $\cos(\delta-\theta)=1$ and $\sin(\delta-\theta)=0$.

$$\sum_g \left( \frac{1}{2H_g} \left( \sum_{g^C \in \mathcal{G}^C} a_{g,n^R,n^D,t}^{CC,g^C} u_{g^C,t} + a_{g,n^R,n^D,t}^{CC,0} \right) \right) \times \Delta P_{n^D}^D \geq$$

$$\sum_g \left( \sum_{g^C \in \mathcal{G}^C} a_{g,n^R,n^D,t}^{C,g^C} u_{g^C,t} + a_{g,n^R,n^D,t}^{C,0} \right) \times RoCoF_{n^R}^{Lim}, \forall n^R, \forall n^D, \forall t$$

(33)

B. VALIDATION OF THE NODE MAXIMUM ROCOF APPROXIMATION

As discussed in Section II and Section III, the formulation of the piecewise linear expression of UC decision variables with respect to the node initial RoCoF could be summarized as a two-step procedure: (1) deriving the relatively complicated yet analytical node initial RoCoF expression under some mild assumptions and approximations, and (2) linearizing the node initial RoCoF expression using combinational reformulation, piecewise approximation and some trivial approximation tricks. It is not difficult to infer that even the analytical node initial RoCoF expression derived in Step 1) has certain modeling errors. Moreover, the conservatism of the node maximum RoCoF expression in Section IV, where the COI RoCoF is taken into account, will also bring errors.

Figure 10:
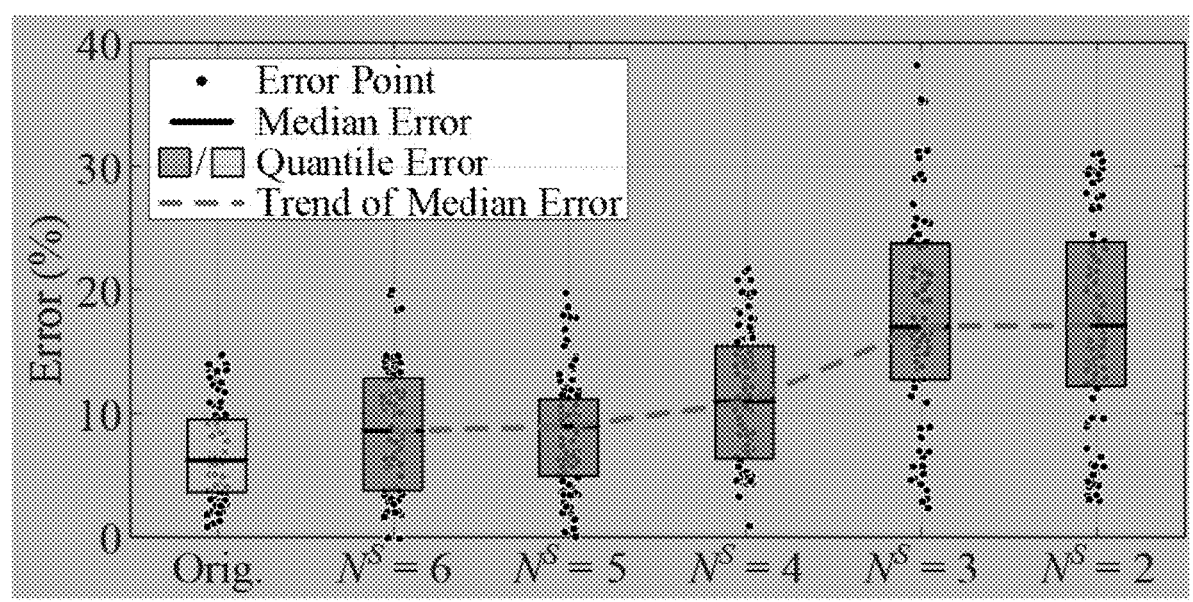
FIG. 10 shows exemplary errors of the original node maximum RoCoF expression and its linearized forms.

FIG. 10 shows exemplary errors of the original node maximum RoCoF expression and its linearized forms. The relative errors of the node maximum RoCoF are illustrated in FIG. 10, where the actual value of the node maximum RoCoF can be obtained by solving the power system differential-algebraic equations. In FIG. 10, the node maximum RoCoF expression without linearization (named as Orig.) and its linearized forms with different scales of generator subsets $G^S$, i.e., the number $N^S$, are shown. Each error point corresponds to a combination of the system operation strategy, the disturbance, and the RoCoF observation node. The three typical disturbances with various locations are considered, and the RoCoF observation nodes are randomly selected. The median error and 25-75% quantile error of all error points are also shown in FIG. 10.

The original node maximum RoCoF expression is accurate with the median error of 6.32% and quantile error less than 10%. For the linearized forms with $N^S$=4,5,6, the median and quantile errors are below 20%, which are acceptable for the day-ahead UC decision-making. The relatively large errors can be found in $N^S$=2,3 and are caused by not insufficient linearization. Due to the randomness of parameter fitting, the median error does not strictly decrease with the increase of $N^S$. Comprehensively considering the serious influence of system topology on frequency dynamics and computational burden, $N^S$=4 is selected in the following case studies, where the errors are around 10%.

The median errors under three typical disturbances with $N^S$=4 are listed in Table IV. It can be seen that the RoCoF approximation under the generator turbine disturbance is the most accurate because the SPC in this case is the simplest. In addition, Table IV also lists the errors when only the RoCoF observation nodes in the low-inertia area are considered. At this time, the conservative COI maximum RoCoF constraint would be inactive, and the modeling errors could be reduced.

TABLE IV

| MEDIAN ERRORS WHEN $N^S$ = 4 (IN %) | | |
|---|---|---|
| Disturbance Type | All Nodes | Low-inertia-area Nodes |
| Load Disturbance | 11.52 | 10.52 |
| Line Switching Disturbance | 13.23 | 11.37 |
| Generator Turbine Disturbance | 10.32 | 9.56 |

C. THE SINGLE-DISTURBANCE CASE

Figure 11:
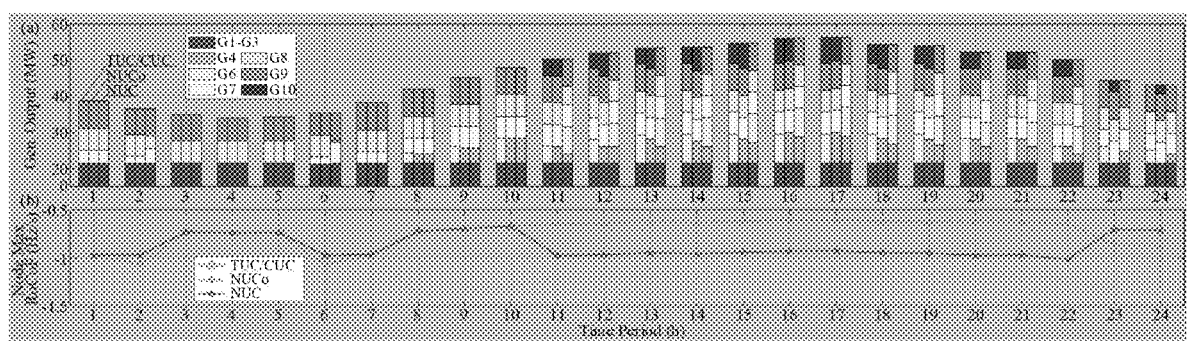
FIG. 11 shows exemplary single load disturbance UC results of (a) generator outputs and (b) actual maximum RoCoF at node 22.

FIG. 11 shows exemplary single load disturbance UC results of (a) generator outputs and (b) actual maximum RoCoF at node 22. In the sequel, the load disturbance is considered. Specifically, the active power of load connected at node 03 could increase by 100 MW in any time slot of the next day, and the maximum RoCoF of node 22 could not exceed 1 Hz/s. The generator outputs under different UC models are demonstrated in FIG. 11(a), where the working status of each generator can be known, and the actual values of the node maximum RoCoF given the UC strategies are shown in FIG. 11(b). It should be pointed out that the outputs of relatively cheap generators G01-G03 remain unchanged in all the time periods of all the UC models, whose outputs are not distinguished for simplicity.

1) Results of the TUC: As shown in FIG. 11(b), the node maximum RoCoF is near the limit from periods 1 to 7, and slightly exceeds the limit at periods 2 and 6. Starting from period 8 to the end, the total inertia of the power system increases, as the more generators are in operation. However, due to commitment of the low-inertia generator G06, the maximum RoCoF at node 22 dramatically exceeds the limitation, demonstrating the necessity of considering the node maximum RoCoF constraint in UC models.

Figure 12:
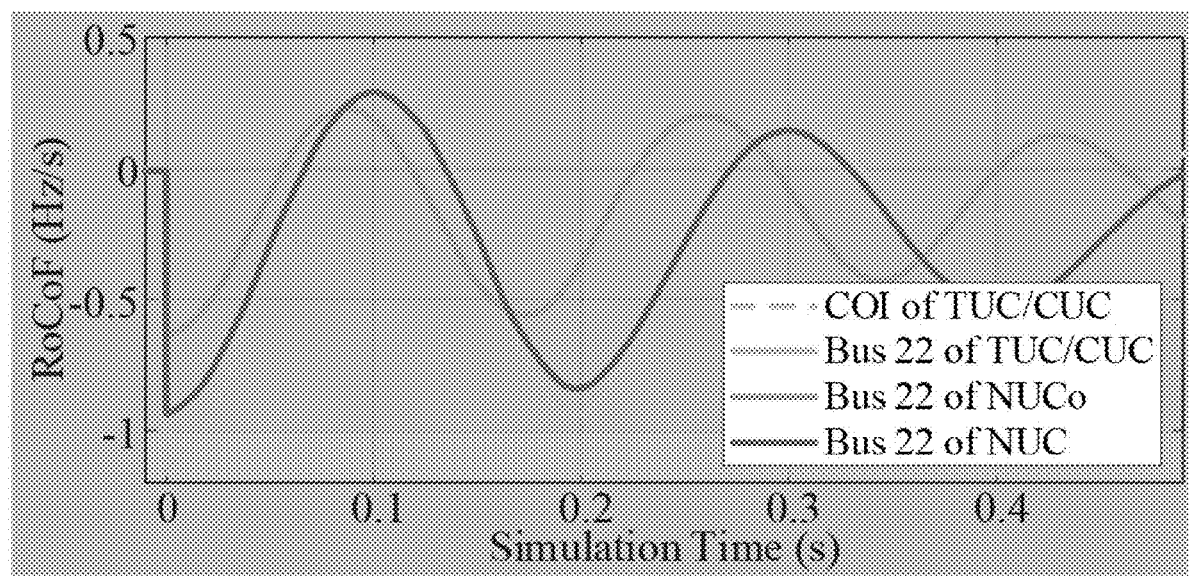
FIG. 12 shows exemplary RoCoF dynamics at time period 16 under the single load disturbance according to an exemplary embodiment.

2) Results of the CUC: It is identical with the TUC, which is quite surprising, as the COI maximum RoCoF constraint is considered. FIG. 12 shows exemplary RoCoF dynamics at time period 16 under the single load disturbance according to an exemplary embodiment. The actual post-disturbance RoCoF dynamics of different UC models at period 16 are summarized in FIG. 12. It can be observed that the COI maximum RoCoF, which is the COI RoCoF at 0 s, under the TUC and the CUC is less than −0.5 Hz/s. Therefore, the CUC has no driving-force to commit more generators. However, as the COI RoCoF could not reflect the spatial difference of the node RoCoF, the actual maximum RoCoF of node 22 would exceed the limit.

3) Results of the NUCo: Due to the over-linearization of the node initial RoCoF expression, the performance of the NUCo is not stable. For example, the maximum RoCoF at periods 2 and 6 exceed the limit, while those of periods 11 to 22 are far below the RoCoF limit. It leads to significant UC costs compared with the proposed NUC, as shown in Table V.

4) Results of the ProposedNUC: Compared with the TUC, the maximum RoCoF at periods 2 and 6 are constrained by adjusting the generator outputs rather than committing more generator. In fact, the outputs increment of the low-inertia generator G07 would increase not only the phase angle difference between the EMF of G07 and the voltage of node 22, but also the electrical distance between G07 and node 22. Increasing the electrical distance would weaken the negative effect of the low-inertia G07 on node 22 frequency dynamics. At periods 1, 3 to 5, and 7, the working status and outputs of generator remain unchanged because the node maximum RoCoF is well constrained in both the TUC and the NUC.

TABLE V

UC COSTS AND SIMULATION BURDEN

| Method | Cost ($) | Binary Variables | Calculation Time (s) |
| --- | --- | --- | --- |
| TUC/CUC | $2.36 \times 10^5$ | 240 | TUC 1.05/CUC 1.19 |
| NUCo | $2.50 \times 10^5$ | 432 | 12.88 |
| NUC | $2.38 \times 10^5$ | 432 | 13.95 |

From period 11 to 22, the maximum RoCoF decreases as the result of replacing G10 with G04 as well as adjusting the generator outputs. Although the inertia constants of G04 and G10 are the same, the inertia of G04 contributes more to the frequency of node 22 because G04 is closer to node 22. At periods 8 to 10 and 22 to 24, because the node maximum RoCoF under the TUC is too large, the cheap but low-inertia generator G06 should be shut down and replaced by G04. Intuitively, the more committed generators, the lower maximum RoCoF would be, yet the UC costs would be higher. Therefore, the maximum RoCoF should be maintained around 1 Hz/s in terms of cost-saving. However, it can be observed that the node maximum RoCoF is not strictly maintained at 1 Hz/s. The reasons are twofold: i) the modeling maximum node RoCoF error during derivation and linearization, and ii) the non-continuity of UC strategies.

The UC costs and simulation burden analysis of different UC models are listed in Table V. For the proposed NUC, the total costs are slightly higher than those of the TUC, because the node maximum RoCoF could be constrained by relatively costless adjusting the generator outputs and system inertia spatial distribution, which means not many more generators need to be committed. Considering $N^S=4$, the number of auxiliary binary variable for linearizing the if-then logic is $2^{N^S} \times 24 = 2^4 \times 24 = 192$, which is appended to 240 decision variables of the TUC model. Therefore, the simulation time increases from 1.05 s to 13.95 s, which is still acceptable for day-ahead decision-making. For the CUC, all the indexes are similar to the TUC. As for the NUCo, the costs are much higher than those of the NUC due to the excessive start up of relatively expensive generators, yet the number of binary variables and the calculation time are similar to the NUC.

D. THE MULTIPLE-DISTURBANCE CASE

Four disturbances are considered in UC model as follows.

D03: The active power of the load connected at node 03 increases by 85 MW.

D24: The active power of the load connected at node 24 increases by 80 MW.

L21-22: The line between node 21 and 22 switches off.

T07: The mechanical power of generator G07 increases by 40 MW.

The RoCoF limitation is the same as Section V.C. The working status of G07 in different UC models, the actual node maximum RoCoF and the active disturbance are listed in Table VI, where three demonstrative periods, say periods 1, 12, and 16, are included.

TABLE VI

UC RESULTS OF THE MULTIPLE-DISTURBANCE CASE

| Method | Period (h) | G07 Status | Max. RoCoF (Hz/s)/ Disturbance | Cost ($) | Binary | Calculation Time (s) |
| --- | --- | --- | --- | --- | --- | --- |
| TUC/ CUC | 1 | On | 2.22/T07 | $2.36 \times 10^5$ | 240 | 1.09 TUC/ 1.18 CUC |
| | 12 | On | 1.82/T07 | | | |
| | 16 | On | 1.79/T07 | | | |
| NUCo | 1 | Off | 0.61/D03 | $3.16 \times 10^5$ | 432 | 20.52 |
| | 12 | Off | 0.38/D24 | | | |
| | 16 | Off | 0.42/L21-22 | | | |
| NUC | 1 | Off | 0.61/D03 | $2.71 \times 10^5$ | 432 | 83.34 |
| | 12 | Off | 0.94/D24 | | | |
| | 16 | Off | 0.98/L21-22 | | | |

For the TUC, the node maximum RoCoF exceeds the limitation, and the most severe disturbance is T07, although its disturbance power is less the other disturbances. The reason is that all the disturbance power of T07 is picked up by the low-inertia generator G07, and the rapid decrement of the rotor speed of G07 would lead to large RoCoF for the nodes around G07. For the proposed NUC, the node maximum RoCoF is below the limitation, where G07 is shut down and the active disturbance causing the maximum RoCoF becomes the other three. It should be noted that the active disturbance varies with periods, which is beneficial for the preventative control of power system frequency stability. In addition, the CUC cannot constrain the node RoCoF, and the node maximum RoCoF of the NUCo is over-constrained, which are similar with the single-disturbance case.

In terms of the UC costs, the proposed NUC is higher than the TUC and CUC, due to the consideration of node initial RoCoF constraints, and is lower than the NUCo, thanks to the more accurate linearization approach. Considering that the generator subset $G^S$ for each disturbance is the same, the number of auxiliary binary variables in the multiple-disturbances case is the same as the single-disturbance case, indicating the acceptable computational burden. Besides, the calculation time increment compared with the single-disturbance case is also acceptable.

VI. Discussion and Conclusion

A. DISCUSSION

1) Adaptation of UC Model to RPG: The RPG can be easily taken into account from two aspects as shown in Table I, i.e., the role of RPG during post-disturbance frequency dynamics and the RPG output uncertainty. For the first aspect, the grid-forming control RPG imitates the swing and inertia characteristics of the synchronous generator, and its model can be regarded as the same as the synchronous generator. The RPG in MPPT mode and the grid-following controlled RPG, whose VI or fast frequency response has an inherent deadband, can not provide active power support in the post-disturbance maximum RoCoF time scale and can be regarded as the load impedance. At this stage, the derivation process in Section II and Section III can be re-performed, and the node maximum RoCoF constraint considering RPG penetration can be constructed. For the second aspect, there is no need to modify the derivation process, just introducing the variables and equations describing the RPG output uncertainty into the UC model (31)-(32) is enough.

2) Online Application: Compared with the traditional UC model, the disturbance information, which includes the types, locations, and disturbed power, should be collected. Since the UC optimization aims at the day-ahead time scale while the disturbance has not occurred, this information should be envisioned by the system operation experience or N−1 contingency pre-simulation.

An inherent mismatch between the UC time scale and RoCoF dynamics time scale can be overcome by increasing the time resolution of the UC model. Since the accurate node RoCoF approximation is provided, which is related to the generator operating status and the system power flow, the proposed method is applicable to the real-time and online scheduling time scale. These adjustments would be fit for the integration of power sources with high flexibility, e.g., the fast-start generators and storages as well as RPG with adjustable virtual inertia control schemes.

B. CONCLUSION

This disclosure provides a method to limit the post-disturbance node maximum RoCoF by optimizing UC decisions, where the spatial difference of frequency dynamics could be described. The node initial RoCoF expressions under common disturbance types, including the load, the line switching, and the generator turbine disturbances, are derived. Then, the piecewise linear relationship between the node initial RoCoF and UC decision variables are obtained. To avoid numerical simulation of the node maximum RoCoF, two analytical constraints, i.e., the node initial RoCoF constraint and the COI maximum RoCoF constraint, are formulated in the UC model. Simulations on the IEEE 39-bus system show that the shortcoming of COI RoCoF constrained UC models and the conservatism brought by the over-linearization of the node initial RoCoF expression. The described UC model could constrain the node maximum RoCoF by adjusting the working status and outputs of generators. In particular, if the post-disturbance RoCoF does not exceed the limitation too much, the described model could drag the RoCoF back to the safety zone by merely adjusting system inertia distribution and generator outputs without committing more generators.

Technical Implementation of the Exemplary System

Figure 13:
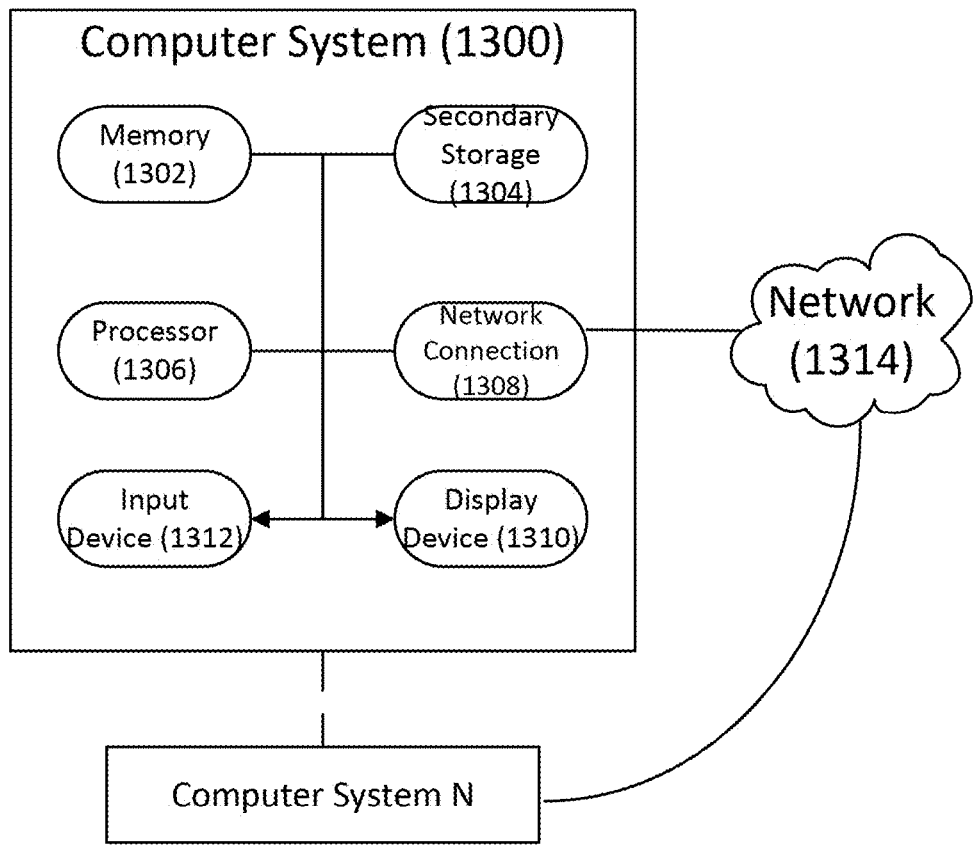
FIG. 13 illustrates exemplary hardware components for a system according to an example embodiment of the present disclosure.

FIG. 13 illustrates exemplary hardware components of an exemplary system. A computer system 1300, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 1300, may run an application (or software) and perform the steps and functionalities described above. Computer system 1300 may connect to a network 1314, e.g., Internet, or other network, to receive inquiries, obtain data, and transmit information and incentives as described above.

The computer system 1300 typically includes a memory 1302, a secondary storage device 1304, and a processor 1306. The computer system 1300 may also include a plurality of processors 1306 and be configured as a plurality of, e.g., bladed servers, or other known server configurations.

The computer system 1300 may also include a network connection device 1308, a display device 1310, and an input device 1312.

The memory 1302 may include RAM or similar types of memory, and it may store one or more applications for execution by processor 1306. Secondary storage device 1304 may include a hard disk drive, floppy disk drive, CD-ROM drive, or other types of non-volatile data storage. Processor 1306 executes the application(s), such as those described herein, which are stored in memory 1302 or secondary storage 1304, or received from the Internet or other network 1314. The processing by processor 1306 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 1300 may store one or more database structures in the secondary storage 1304, for example, for storing and maintaining the information necessary to perform the above-described functions. Alternatively, such information may be in storage devices separate from these components.

Also, as noted, processor 1306 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 1300.

The input device 1312 may include any device for entering information into the computer system 1300, such as a touch-screen, keyboard, mouse, cursor-control device, microphone, digital camera, video recorder or camcorder. The input and output device 1312 may be used to enter information into GUIs during performance of the methods described above. The display device 1310 may include any type of device for presenting visual information such as, for example, a computer monitor or flat-screen display (or mobile device screen). The display device 1310 may display the GUIs and/or output from sub-system components (or software).

Examples of the computer system 1300 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1300 is shown in detail, system 1300 may use multiple computer systems or servers as necessary or desired to support the users and may also use back-up or redundant servers to prevent network downtime in the event of a failure of a particular server. In addition, although computer system 1300 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1300, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

APPENDIX

A. LINEAR APPROXIMATION FORMS

1) If-then Logic: The auxiliary variable $v_t$ in (A.1a) indicates the working status combination of generators in $G^S$. The auxiliary variable $s_{p,t}$ in (A.1b) and (A.1c) is determined by $v_t$ and used to linearize the if-then logic.

$$v_t = \sum_{g^S \in G^S} 2^{N^S - g^S} u_{g^S,t} + 1, \forall t \quad \text{(A.1a)}$$

$$\sum_p s_{p,t} = 1, \forall t \quad \text{(A.1b)}$$

$$v_t = \sum_p 2^{g^S - 1} s_{p,t}, \forall t \quad \text{(A.1c)}$$

Taking the calculation of as $$a_{g,n^R,n^D,t}^{CS,g^C}$$

an example, the if-then logic $$a_{g,n^R,n^D,t}^{CS,g^C} = \Gamma_{g,n^R,n^D,t}^{CS,g^C} [u_{g^S}(\forall g^S \in G^S)]$$

can be linearly calculated as follows $$-M(1-s_{p,t}) \leq a_{g,n^R,n^D,t}^{CS,g^C} - \Gamma_{g,n^R,n^D,t}^{CS,g^C}[p] \leq M(1-s_{p,t}), \forall p, \forall t, \quad \text{(A.2)}$$

where M is a large positive number and chosen as $10^6$.

2) Bilinear Term: Taking the product of $u_{g^c,t}$ and $\delta_{g,t}$ as an example, the big-M linearization is shown in (A.3) and the auxiliary variable $w_{g,g^c,t} = u_{g^c,t} \delta_{g,t}$ is introduced.

$$w_{g,g^c,t} \leq Mu_{g^c,t}, \forall g, \forall g^c, \forall t \quad \text{(A.3a)}$$

$$w_{g,g^c,t} \geq -Mu_{g^c,t}, \forall g, \forall g^c, \forall t \quad \text{(A.3b)}$$

$$w_{g,g^c,t} \leq \delta_{g,t} + M(1-u_{g^c,t}), \forall g, \forall g^c, \forall t \quad \text{(A.3c)}$$

$$w_{g,g^c,t} \geq \delta_{g,t} - M(1-u_{g^c,t}), \forall g, \forall g^c, \forall t \quad \text{(A.3d)}$$

B. NODE INITIAL ROCOF CONSTRAINT

1) Line Switching Disturbance: It is shown in (B.1a), where $\alpha'^{\{\cdot\}}_{\{\cdot\}}$ is piecewise-linearly fitted according to $A'^{\{\cdot\}}_{\{\cdot\}}$ in the (B.1b)-(B.1k). The phase angle in (B.1a) can also be calculated by DC power flow model.

2) Generator Turbine Disturbance: It is as follows and $\alpha''^{\{\cdot\}}_{\{\cdot\}}$ is fitted according to $A''^{\{\cdot\}}_{\{\cdot\}}$.

$$\frac{1}{2H_{g^T}}\left(-\left(\sum_{g^C \in G^C} a_{n^R,g^T,t}^{"S,u_{g^C},t} u_{g^C,t} + a_{n^R,g^T,t}^{"S,0}\right) \times (\delta_{g^T,t} - \theta_{n^R,t}) + \left(\sum_{g^C \in G^C} a_{g^T,n^R,t}^{"C,g^C} u_{g^C,t} + a_{g^T,n^R,t}^{"C,0}\right)\right) \times \Delta P_{g^T}^T \leq RoCoF_{n^R}^{Lim}, \forall n^R, \forall g^T, \forall t \quad \text{(B.2a)}$$

$$A_{n^R,g^T,t}^{"C} = B_{n^R,g^T,t}\cos\beta_{n^R,g^T,t} \quad \text{(B.2b)}$$

$$A_{n^R,g^T,t}^{"S} = B_{n^R,g^T,t}\sin\beta_{n^R,g^T,t} \quad \text{(B.2c)}$$

What is claimed is:

1. A method for avoiding blackouts caused by an RoCoF-based relay tripping in a power system by limiting a post-disturbance node maximum rate of change of frequency ("RoCoF") by optimizing UC decisions, the method comprising:

determining post-disturbance node initial rate of change of frequency ("RoCoF") by:

determining a load disturbance power $\Delta P_g^{G,0}$ picked up by a g-th generator, where $S_{g,n^D}$ is a synchronizing power coefficient (SPC) between a disturbed load and a generator based on $$\Delta P_g^{G,0} = S_{g,n^D}^D \Delta P_{n^D}^D \quad \text{(3a)}$$

$$S_{g,n^D}^D = \frac{E_g U_{n^D} Y_{g,n^D}^{GD} \sin(\delta_g - \theta_{n^D}) - \gamma_{g,n^D}^{GD})}{\sum_{g^B} E_{g^B} U_{n^D} Y_{g^B,n^D}^{GD} \sin(-(\delta_{g^B} - \theta_{n^D}) - \gamma_{g^B,n^D}^{GD})} \quad \text{(3b)}$$

wherein $E_g e^{j\delta_g}$ is the g-th element of $\dot{E}$, a generator EMF of the g-th generator;

and $Y_{g,n^D}^{GD} e^{j\gamma_{g,n^D}^{GD}}$ is g-th element of $\dot{Y}_{n^D}^{GD}$, a equivalent admittance between the g-th generator and $n^D$-th node;

determining a line switching disturbance power picked up by the g-th generator based on:

$$\Delta P_g^{G,0} = S_{g,iL}^L \Delta P_{iL}^L \quad \text{(7a)}$$

$$S_{g,iL}^L = \frac{\begin{pmatrix} L_{g,n^S}^{GD} L_{n^S,n^E}^{DD} + L_{g,n^S}^{GD} L_{n^E,n^E}^{DD} \\ -L_{n^S,n^S}^{DD} L_{g,n^E}^{GD} - L_{n^E,n^S}^{D} L_{g,n^E}^{GD} \end{pmatrix}}{L_{n^S,n^E}^{DD} L_{n^E,n^S}^{DD} - L_{n^S,n^S}^{DD} L_{n^E,n^E}^{DD}} \quad \text{(7b)}$$

wherein $S_{g,iL}^L$ is an extended SPC of the line switching disturbance; and determining a generator turbine disturbance SPC $S_{g,g^T}^T$ based on:

$$\Delta P_g^{G,0} = S_{g,g^T}^T \Delta P_{g^T}^T \quad \text{(9a)}$$

-continued $$S_{g,g^T}^T = \begin{cases} 1, & g = g^T \\ 0, & g \neq g^T \end{cases} \quad (9b)$$

wherein a disturbance power of a $g^T$-th disturbed generator is $\Delta P_{g^T}^D$, and the SPC is made up of constant values and equal to 1 only a disturbed generator is concerned;

determining node frequency $\Delta f_{n^R}^D$ as follows:

$$\Delta f_{n^R}^D = \sum_g F_{n^R,g} \Delta f_g^G, \quad (18a)$$

$$F_{n^R,g} = \frac{E_g}{U_{n^R}} B_{n^R,g} \cos(\delta_g - \theta_{n^R} + \beta_{n^R,g}), \quad (18b)$$

wherein $F_{n^R,g}$ is named as frequency formation coefficient (FFC) for g-th generator;

determining impacts of UC decision variables on the FFC and the SPC;

approximating node initial RoCoF and the UC decision variables by approximating linear fitting coefficients $\alpha^{g^c}$ and $\alpha^0$:

$$A_{(\cdot)}^{(\cdot),Fit} = \sum_{g^C \in \mathcal{G}^C} a^{g^c} u_{g^c} + a^0 \quad (25a)$$

$$a^{g^c} = \Gamma^{g^c}[u_{g^s}(\forall g^S \in \mathcal{G}^S)] \quad (25b)$$

$$a^0 = \Gamma^0[u_{g^s}(\forall g^S \in \mathcal{G}^S)] \quad (25c)$$

wherein $\Gamma^{g^c}[\cdot]$ and $\Gamma^0[]$ represent a if-then logic;

approximating a maximum RoCoF of any node as:

$$\text{RoCoF}_{n^R,t}^{Max} = \max\{\text{RoCoF}_{n^R,t}^{d,0}, \text{RoCoF}_{COI,t}^{d,Max}, \forall d\}. \quad (26)$$

wherein COI maximum RoCoF constraints are as follows:

$$\Delta P_{n^D}^D \leq 2\sum_g H_g u_{g,t} RoCoF_{n^R}^{Lim}, \forall n^R, \forall n^D, \forall t \quad (30a)$$

$$\Delta P_{g^T}^T \leq 2\sum_g H_g u_{g,t} RoCoF_{n^R}^{Lim}, \forall n^R, \forall g^M, \forall t \quad (30b)$$

constructing an RoCof constrained UC model as follows:

$$\min \sum_t \sum_g \left(C_g(P_{g,t}^G) + C_g^U z_{g,t}^U + C_g^D z_{g,t}^D\right),$$

$$C_g(P_{g,t}^G) = C_g^{R2} P_{g,t}^{G2} + C_g^{R1} P_{g,t}^G + C_g^{R0}.$$

collecting future 24-hour operation data of the power system including a power system topology and parameters, forecasted load curves, node RoCoF limitations, and envisioned disturbances;

substituting the future 24-hour operation data into the UC model and solving the UC model by the optimization algorithm to obtain an operating status and a power output of synchronous generators for a future 24 hours;

avoiding the blackouts caused by a RoCoF-based relay tripping by operating the power system using a stable frequency such that the post-disturbance node RoCoF does not exceed a predetermined limitation.

* * * * *